(12) United States Patent
Schopf et al.

(10) Patent No.: US 9,322,161 B2
(45) Date of Patent: Apr. 26, 2016

(54) CLAMPS FOR PANELS

(76) Inventors: John Michael Schopf, Thornbury (AU); Manfred Schopf, Thornbury (AU)

( * ) Notice: Subject to any disclaimer, the term of this patent is extended or adjusted under 35 U.S.C. 154(b) by 0 days.

(21) Appl. No.: 14/343,667

(22) PCT Filed: Sep. 10, 2012

(86) PCT No.: PCT/IB2012/001740
§ 371 (c)(1),
(2), (4) Date: Aug. 29, 2014

(87) PCT Pub. No.: WO2013/034973
PCT Pub. Date: Mar. 14, 2013

(65) Prior Publication Data
US 2014/0366479 A1    Dec. 18, 2014

(30) Foreign Application Priority Data

Sep. 8, 2011   (AU) ............................... 2011903654
Oct. 10, 2011   (AU) ............................... 2011904258
Aug. 10, 2012   (AU) ............................... 2012903448

(51) Int. Cl.
| | | |
|---|---|---|
| *E04B 1/38* | (2006.01) |
| *E04C 5/00* | (2006.01) |
| *E04B 1/41* | (2006.01) |
| *E04F 11/18* | (2006.01) |
| *F16B 2/12* | (2006.01) |
| *E06B 3/58* | (2006.01) |
| *F16B 2/10* | (2006.01) |
| *F16B 2/06* | (2006.01) |

(52) U.S. Cl.
CPC ................. *E04B 1/4107* (2013.01); *E04B 1/38* (2013.01); *E04F 11/1851* (2013.01); *F16B 2/06* (2013.01); *E06B 3/5864* (2013.01); *F16B 2/065* (2013.01);

(Continued)

(58) Field of Classification Search
CPC .............. F16B 2/06; F16B 2/12; F16B 2/065; F16B 2/10; E04B 1/4107; E06B 3/5864; Y10T 29/49826
USPC ............. 52/713, 712, 711, 474, 489.1, 489.2, 52/775, 767, 778, 127.12, 127.11, 127.9, 52/DIG. 1; 269/297; 254/131, 134
See application file for complete search history.

(56) References Cited

U.S. PATENT DOCUMENTS 4,671,016 A * 6/1987 Boeckx ........................... 49/501
4,914,888 A * 4/1990 Hanson ........................... 52/768

(Continued)

FOREIGN PATENT DOCUMENTS

AU    2009201283 B1    9/2010
NZ         561106 A    11/2008

OTHER PUBLICATIONS

International Search Report, International Application No. PCT/IB2012/001740, filed Mar. 6, 2012, Australian Patent Office (ISA/AU), Date of Completion Dec. 10, 12, Date of Mailing Dec. 10, 12, Authorised Officer: Emma Francis.

*Primary Examiner* — Chi Q Nguyen
(74) *Attorney, Agent, or Firm* — Hogan Lovells US LLP

(57) ABSTRACT

The present application discloses improvements to support clamps for panels of glass and the like. An arrangement of two clamping halves (9000) each having a clamping surface (9001) and a locating component (9070) interlocking the two halves. Each of the two clamping surfaces are brought together by movement of the locating component through a range of positions, preferably lengthwise, such that portions of them are urged apart thus pressing together the clamping surfaces and securing the panel. In addition the first and second clamp halves include each an opening for a fastener (7014) within a flange (7010, 7012) such that the second opening is oriented approximately perpendicular to the first opening.

10 Claims, 27 Drawing Sheets

(52) U.S. Cl.
CPC .... *F16B 2/10* (2013.01); *F16B 2/12* (2013.01); *Y10T 29/49826* (2015.01)

(56) References Cited

U.S. PATENT DOCUMENTS

| | | | |
|---|---|---|---|
| 5,302,039 A * | 4/1994 | Omholt | 403/218 |
| 6,434,905 B1 | 8/2002 | Sprague | |
| 6,912,818 B2 * | 7/2005 | Sprague | 52/208 |
| 7,584,588 B2 * | 9/2009 | Kim | 52/800.14 |
| 7,703,256 B2 * | 4/2010 | Haddock | 52/543 |
| 7,963,077 B2 * | 6/2011 | Lin | 52/204.597 |
| 8,500,110 B2 * | 8/2013 | Allen | 269/297 |
| 2012/0261631 A1 | 10/2012 | Schopf et al. | |
| 2014/0366479 A1 * | 12/2014 | Schopf et al. | 52/711 |

* cited by examiner

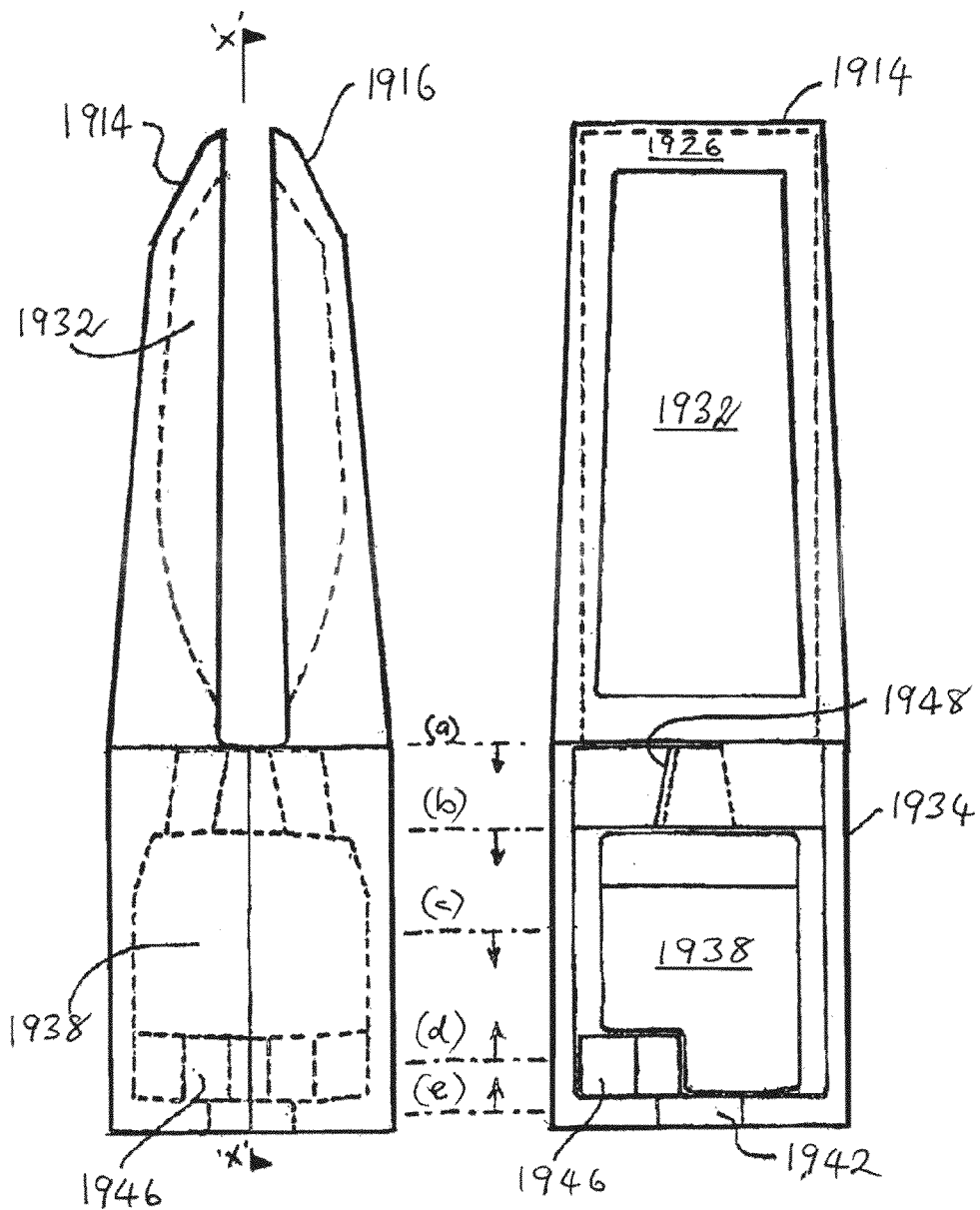

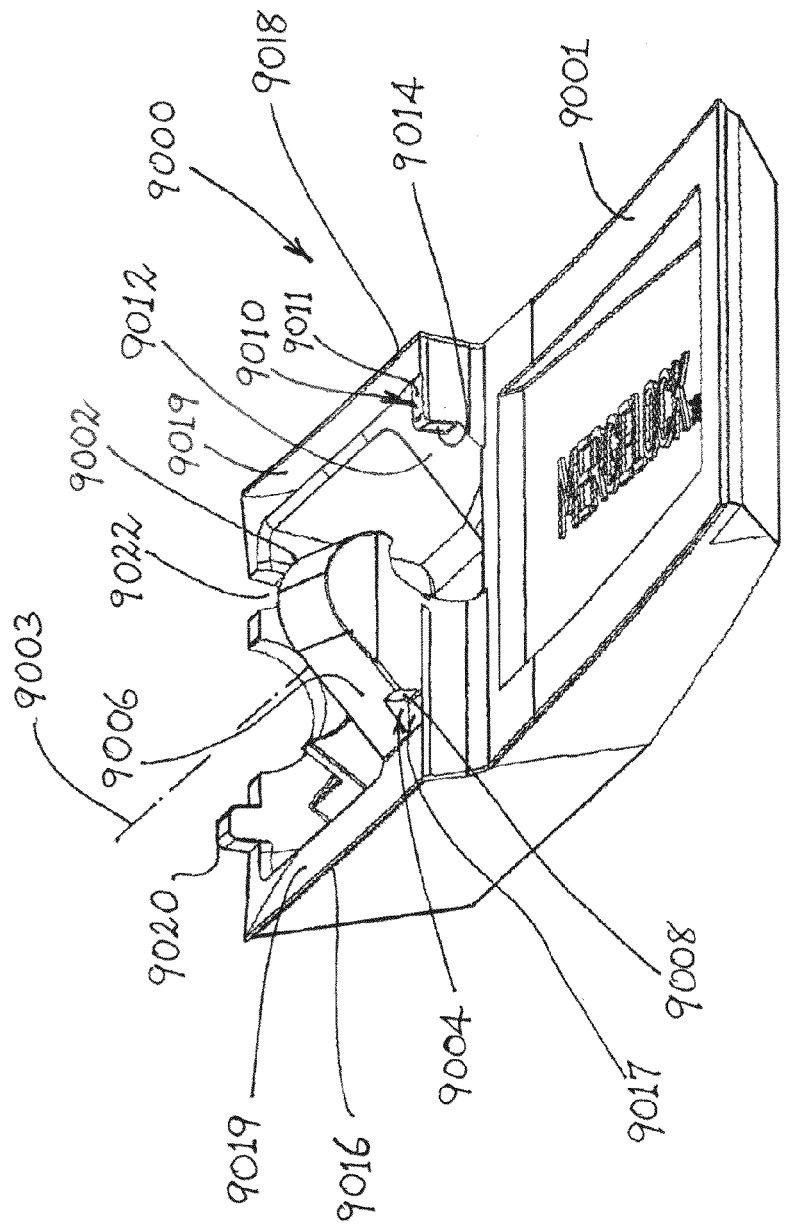

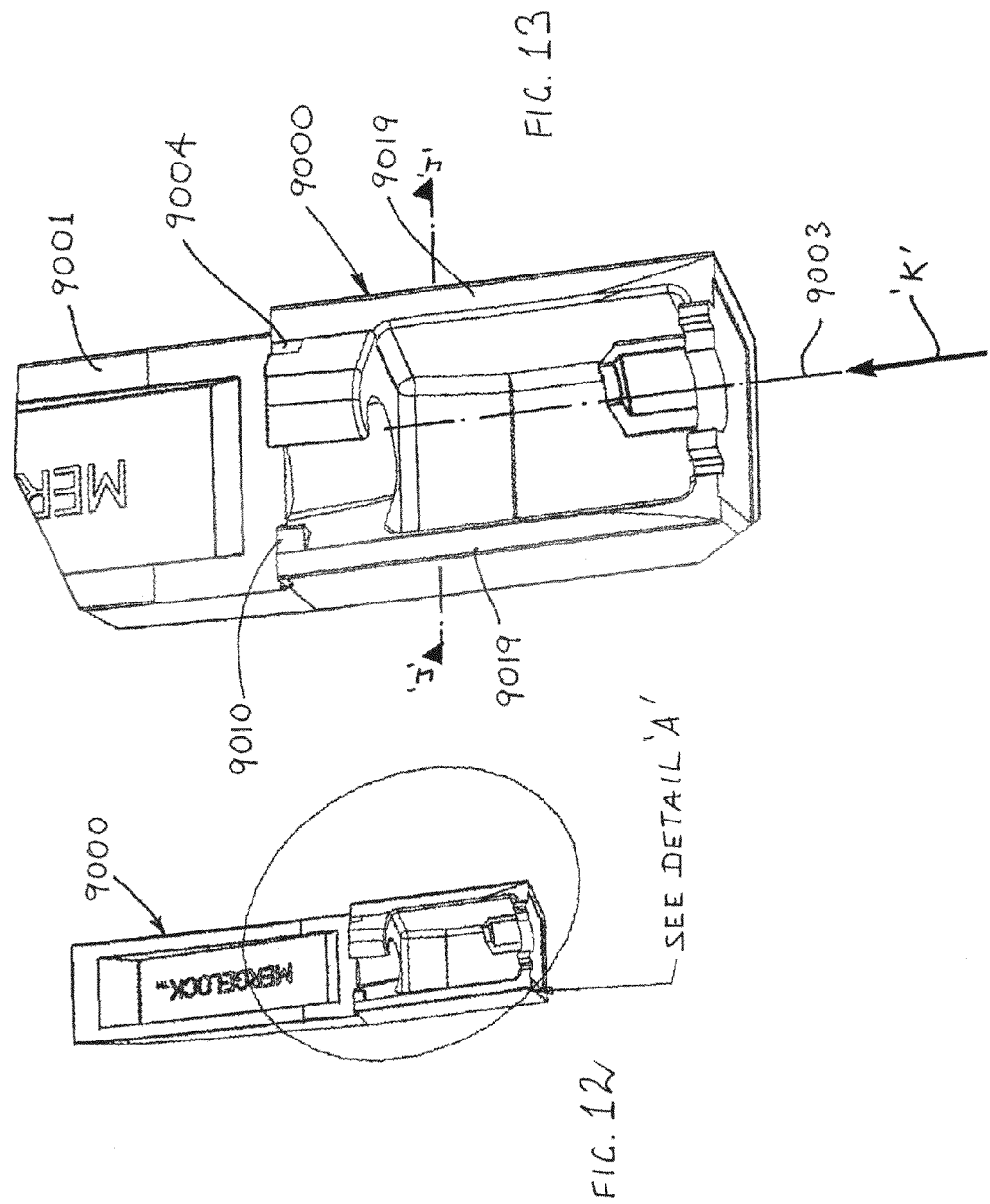

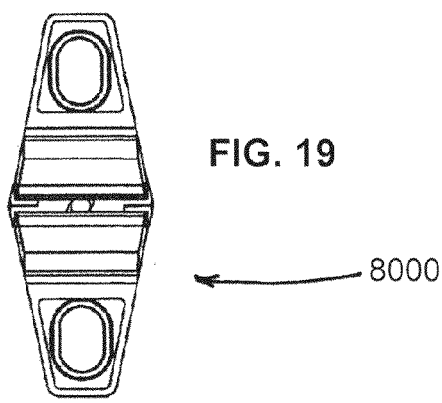
FIG. 19
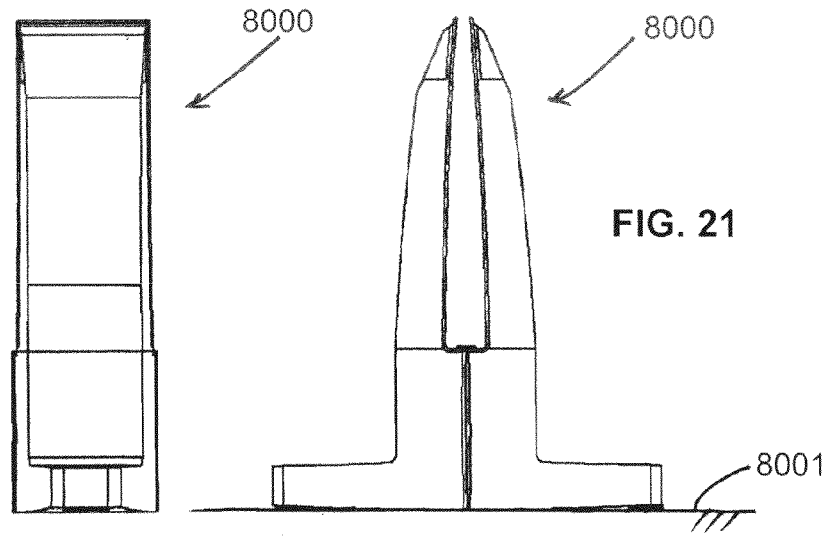
FIG. 20
FIG. 21

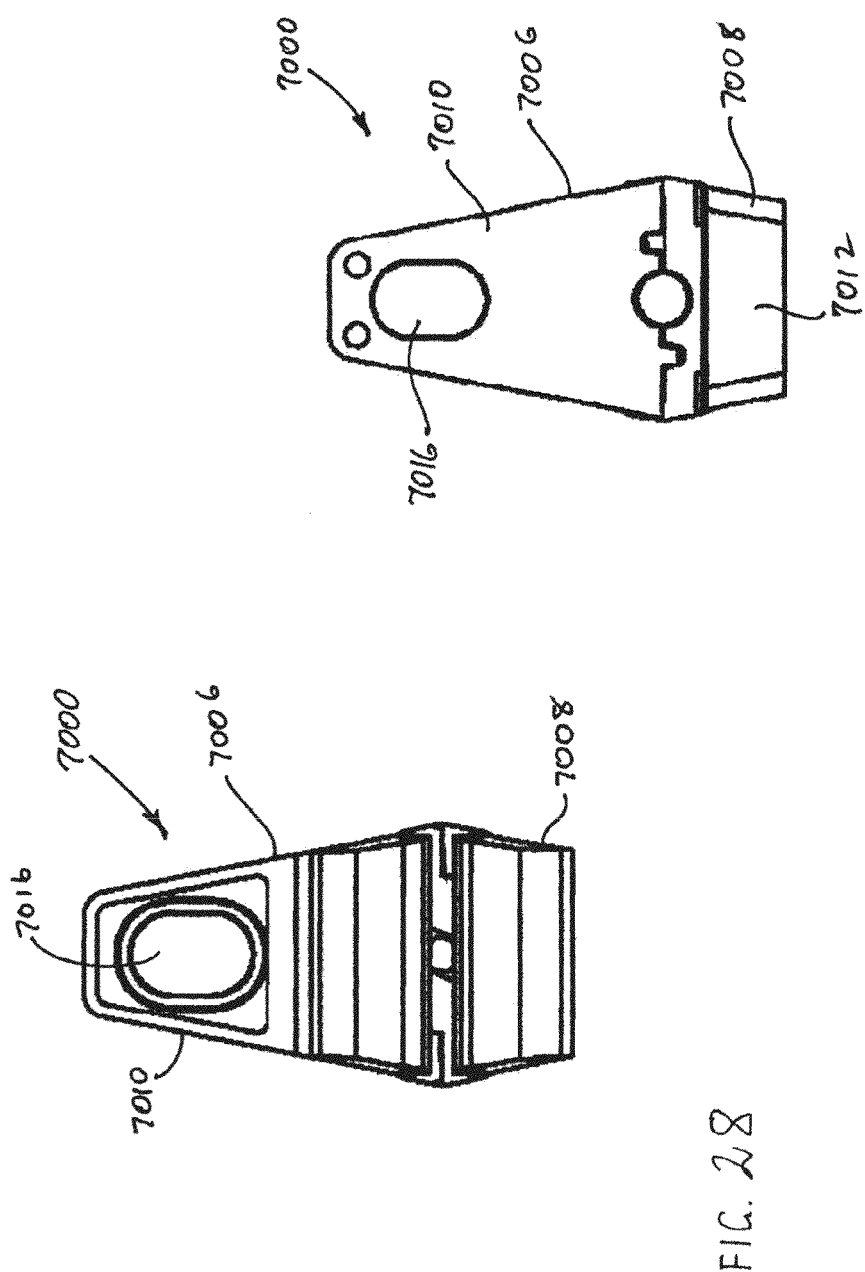

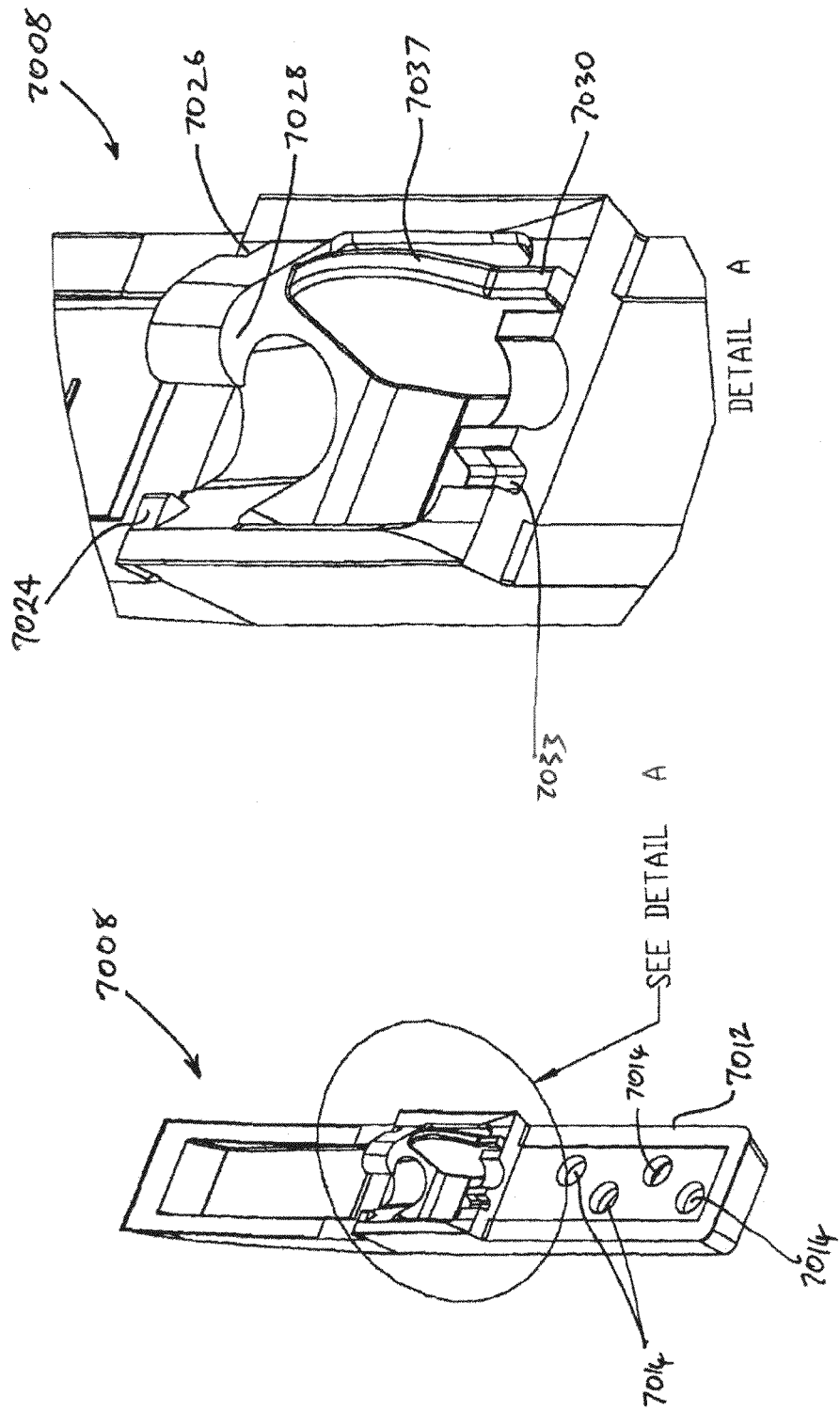

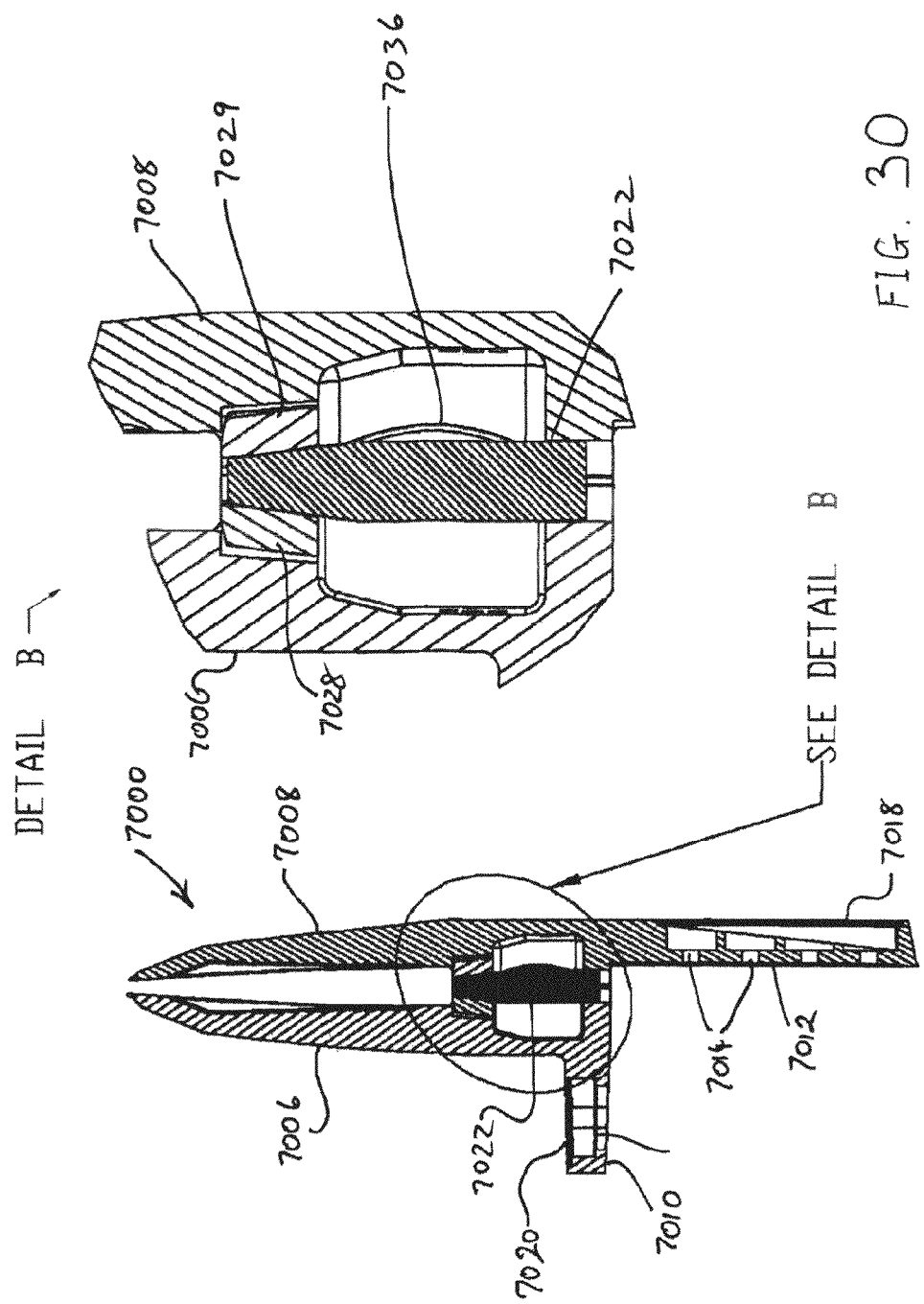

CLAMPS FOR PANELS

CROSS-REFERENCE TO RELATED APPLICATIONS

This application is a U.S. National Phase filing under 35 U.S.C. §371 of PCT/IB2012/001740, which was filed on Sep. 10, 2012, which is herein incorporated in its entirety, which claims priority to Australian Application No.: 2011903654, which was filed on Sep. 8, 2011, Australian Application No.: 2011904258, which was filed on Oct 10, 2011, and Australian Application No. 2012903448, which was filed on Aug. 10, 2012, which are all herein incorporated in their entirety.

FIELD OF THE INVENTION

The invention described here relates to improved clamps for panels, with particular reference to clamps for use in fences and barriers.

BACKGROUND

FIG. 1 is a perspective view of a portion of a fence 1 that comprises a plurality of panels 2 arranged end-to-end with small gaps 3 therebetween, each panel being held in a vertical plane by two clamps 4, with clamps 4 being set into a supporting surface 5. Fences of this type, typically with panels 2 being made of glass or a transparent plastic (for example those sold under the trade marks Lexan and Perspex), are widely used as security fences for swimming pools, to mark boundaries of eating areas of restaurants and in like applications. They have sometimes been used as balustrades on buildings.

The appearance and the speed and ease of erection of fence 1 are dependent in part on the design of the panel-supporting clamps 4, as of course is the structural integrity and safety of fence 1. Clamps applicable to such fences, and to certain other fences also, are described below. These are believed to be useful additions to the choices available to designers, when judged by the combination of appearance, erection ease and speed, and by the safety and integrity they offer.

The clamps disclosed herein can avoid or limit the obtrusive sight of fasteners on the clamps' exteriors. By way of example, a prior art clamp having externally visible fasteners is disclosed by Austin in International Patent Publication No. WO03/091516.

There are further provided clamps that have improved means for holding together their main parts so that they can be assembled in more accurate alignment with each other.

SUMMARY OF THE INVENTION

Throughout this specification, clamps for panels are described that comprise two main parts, each of which has a clamping surface that in use bears directly or via a spacer or gasket against a face of a panel that is clamped. For clarity conciseness and convenience, each such part will be referred to, throughout this specification including in the appended claims, as a "clamp half". It is not intended to imply that such a "clamp half" necessarily constitutes half of a clamp, and indeed all of the clamps described herein include two "clamp halves" and other parts.

In a first invention, there is provided a clamp for panel-shaped members comprising:

a first clamp half comprising a first clamping surface;

a second clamp half comprising a second clamping surface; and a locating component, wherein said first and second clamp halves and said locating component in use interlock with each other so that said first clamping surface and said second clamping surface are positioned to press respectively against opposing faces of a panel positioned therebetween, and further wherein:

said first clamp half has a first surface that faces generally in a direction opposite to the first clamping surface and said second clamp half has a first surface that faces generally in a direction opposite to the second clamping surface so that urging apart of said first surfaces by the locating component urges the clamping surfaces of the clamp halves towards each other;

the locating component is capable of movement through a range of positions relative to said first surfaces until a final position is reached in which position the locating component lies between and urges apart the first surfaces so as to urge said first and second clamping surfaces against opposing faces of the panel therebetween;

the first clamp half comprises a first guide surface and the second clamp half comprises a second guide surface;

the said first surfaces of the first and second clamp halves are so oriented relative to the locating component as to urge together the first and second guide surfaces during at least a part of said movement of the locating component, whereby to at least partially guide the relative movement of the first and second clamping means during such movement.

Further according to the first invention, there is provided a clamp for panel-shaped members comprising:

a first clamp half having a first clamping surface;

a second clamp half having a second clamping surface; and an elongate locating component having a tapered portion, wherein:

the first clamp half comprises a first formation and the second clamp half comprises a second formation;

the locating component is movable lengthwise during assembly of the clamp so that the tapered portion moves between the first and second components whereby to urge them portions of them apart so that the first and second clamping surfaces are urged towards each other so as to clamp a panel between the first and second clamping surfaces;

and further wherein:

the first clamp half comprises a first guide surface and the second clamp half comprises a second guide surface which guide surfaces when held in abutment with each other during movement of the first and second clamping surfaces towards each other prevent at least in their vicinity relative movement of the first and second clamp halves in a plane perpendicular to the movements of both the clamping surfaces and the locating component; and the urging apart of the portions of the first and second formations moves the guide surfaces into abutment and subsequently holds the guide surfaces in abutment.

In a second invention, there is provided a clamp for clamping panel-shaped members, comprising:

a first clamp half having a first clamping surface;

a second clamp half having a second clamping surface;

means for securing the first and second clamp halves together with a panel-shaped member clamped between the first clamp surface and the second clamping surface, and wherein:

the first clamp half comprises a flange with a first opening for a fastener therein said first opening oriented so that a fastener extending through the first opening can secure the flange to a first support surface;

the second clamp half comprises a portion with at least one second opening for a fastener therein said second opening oriented approximately perpendicular to the first opening, so that a fastener extending through the or a said second opening can secure the portion to a second support surface that is approximately perpendicular to the first support surface.

It is preferred that the said portion have a face oriented to in use abut said second surface.

It is further preferred that a panel-shaped member clamped in the clamp lie parallel to and be at least approximately co-planar with the face oriented to in use abut said second surface.

A clamp according to this second invention may be adapted to be mounted on a right-angled corner of a structure, such as a concrete slab forming a balcony or the like.

It is particularly preferred to provide a clamp according to this second invention is a clamp that accords with the first invention mentioned above, in respect of the way in which the first and second clamp halves are connected to each other. Such an embodiment of this second invention is disclosed herein by reference to FIGS. 23 to 31.

There is further provided herein a third invention applicable to clamps for panel-shaped members by means of which third invention a fastener used either to hold parts of a clamp together or to secure the clamp to a structure can be concealed by a cover plate that is readily removable when required.

This third invention provides, in a clamp for panel-shaped members, the improvement wherein:

a portion of a fastener holding together parts of the clamp or securing the clamp to a structure is received within a recess;

the recess is in use of the clamp covered by a cover plate that is received close-fittingly in the recess;

the recess contains one or more lands against which one or more lands the cover plate abuts when in its installed position and to which the cover plate can be adhered so as to secure the cover plate within the recess;

the lands are so proportioned and so positioned within the recess that a first portion of the cover plate can be moved inward into the recess by application to the cover plate of a force directed outside a periphery of the one or more lands whereby a second portion of the cover plate emerges from the recess.

A preferred embodiment of the second invention is disclosed herein that also embodies this third invention.

Everywhere in this specification, the word "comprise" and derivatives thereof such as "comprising" and "comprises" when used in relation to a set of elements integers features or steps are to be taken to indicate that the elements integers features or steps are present, but are not to be taken to preclude the possibility of other elements integers features or steps being present also.

No reference in this specification to a particular patent or other publication or to prior art is to be interpreted as conceding that the contents of that patent or publication, or that piece of prior art are a part of the common general knowledge in any jurisdiction.

Preferred embodiments of the inventions will be further described in the following detailed description, by reference to the attached Figures, of which:

FIG. 5 is a side view of the clamp shown in FIG. 2, showing hidden lines;

FIG. 6 is a front view of one of two identical clamp halves of the clamp shown in FIG. 2 and is aligned vertically with FIG. 5;

Figure 1:
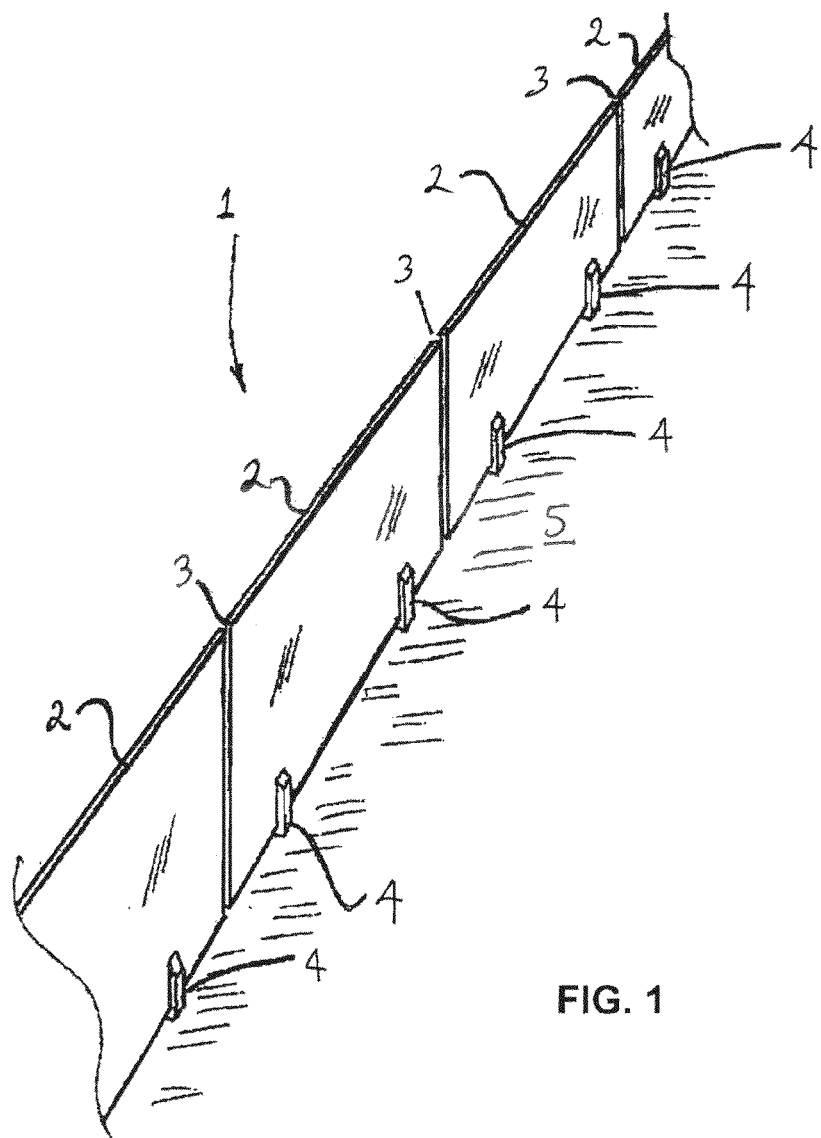
FIG. 1 is a perspective view of a portion of a fence having clamps of a type disclosed herein.
Figures 2, 3:
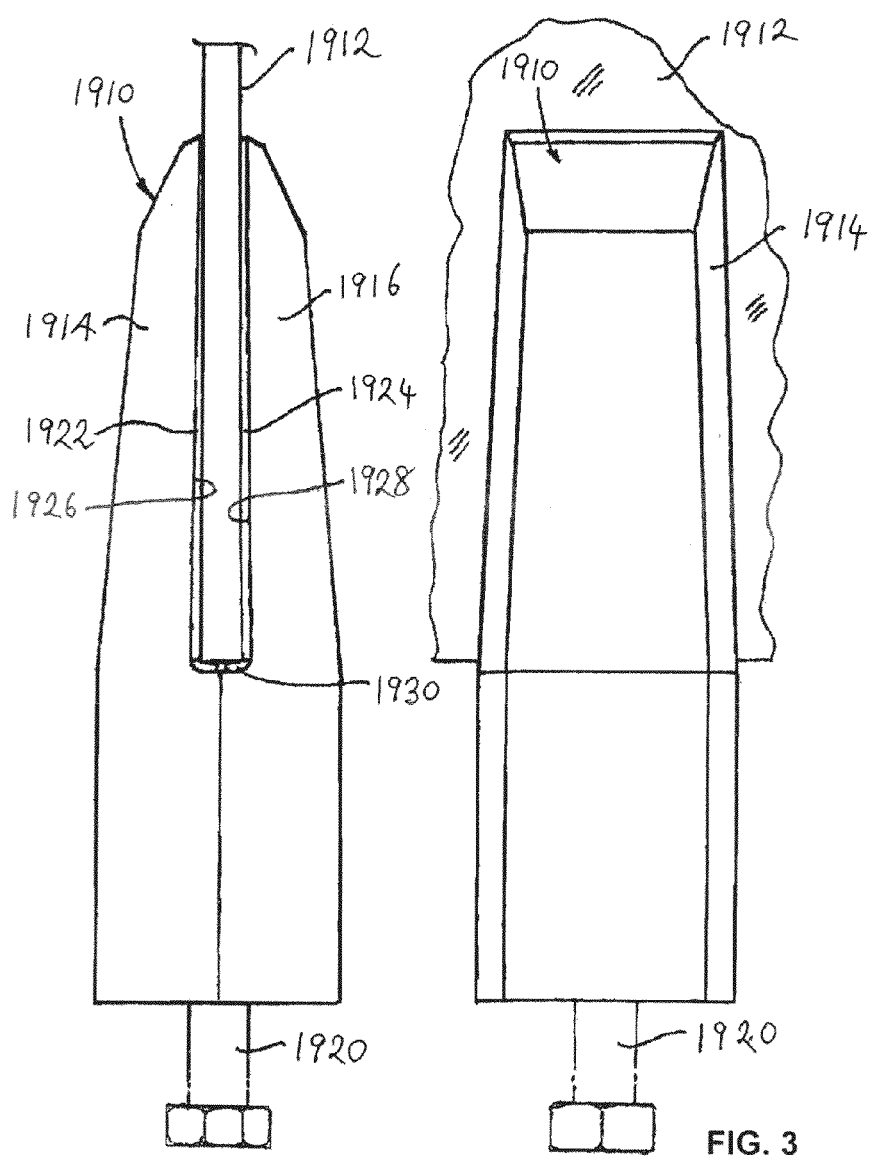
FIG. 2 is a side view of a prior art clamp, supporting and clamping a glass panel.
FIG. 3 is a front view of the clamp shown in FIG. 2.
Figure 4:
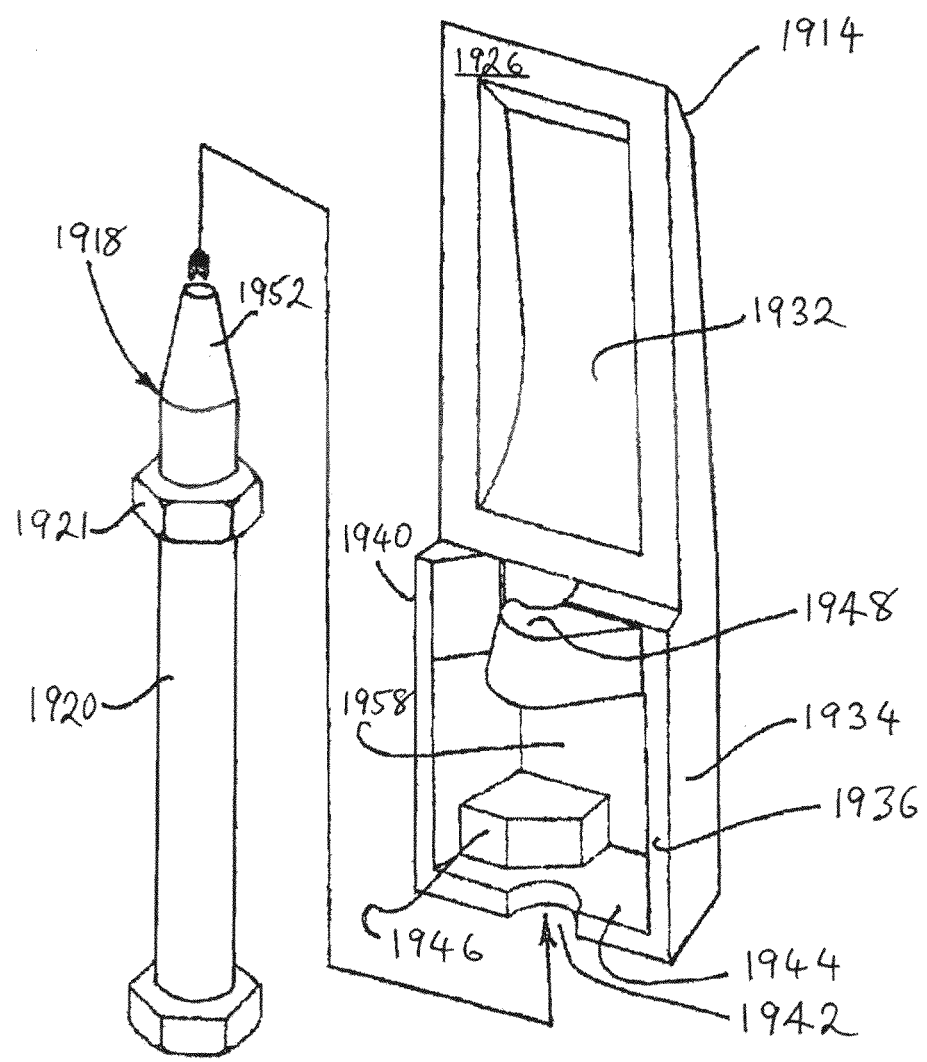
FIG. 4 is a perspective view of one of two identical clamp halves of the clamp shown in FIG. 2 together with a nut-and-bolt assembly of that clamp.
Figure 7:
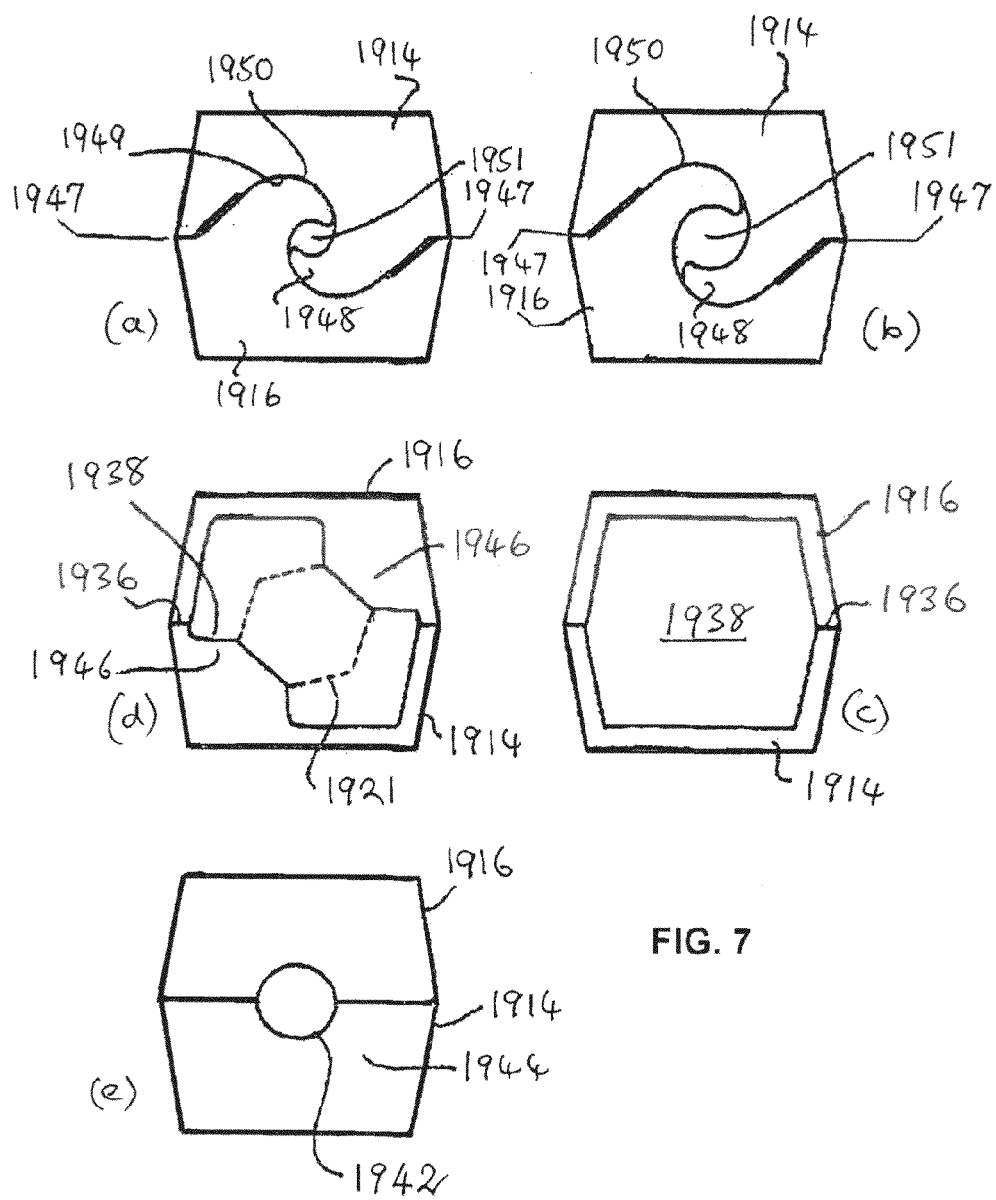
Figure 8:
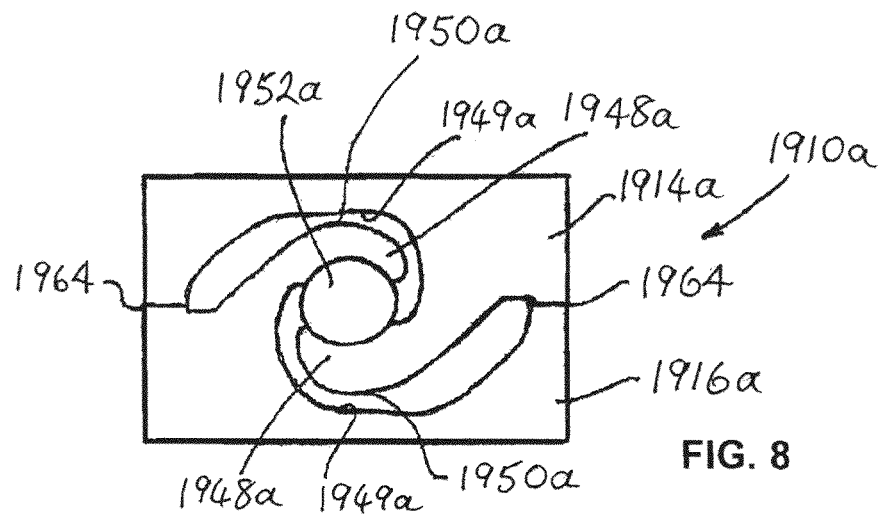
Figure 9:
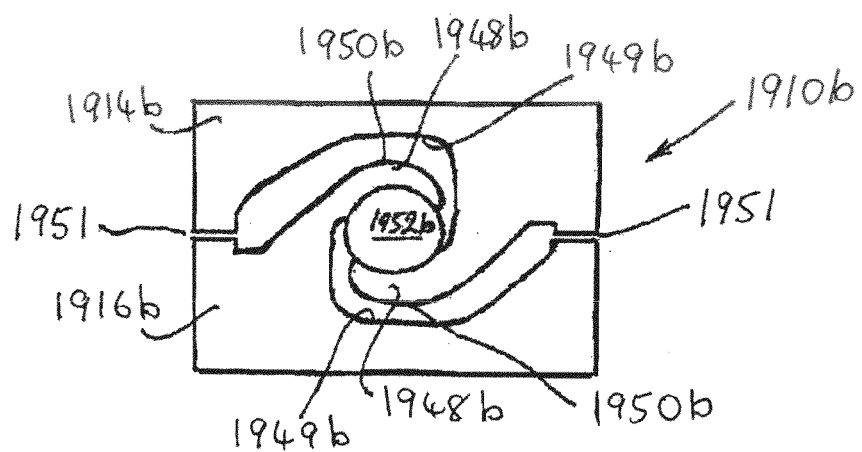
Figure 10:
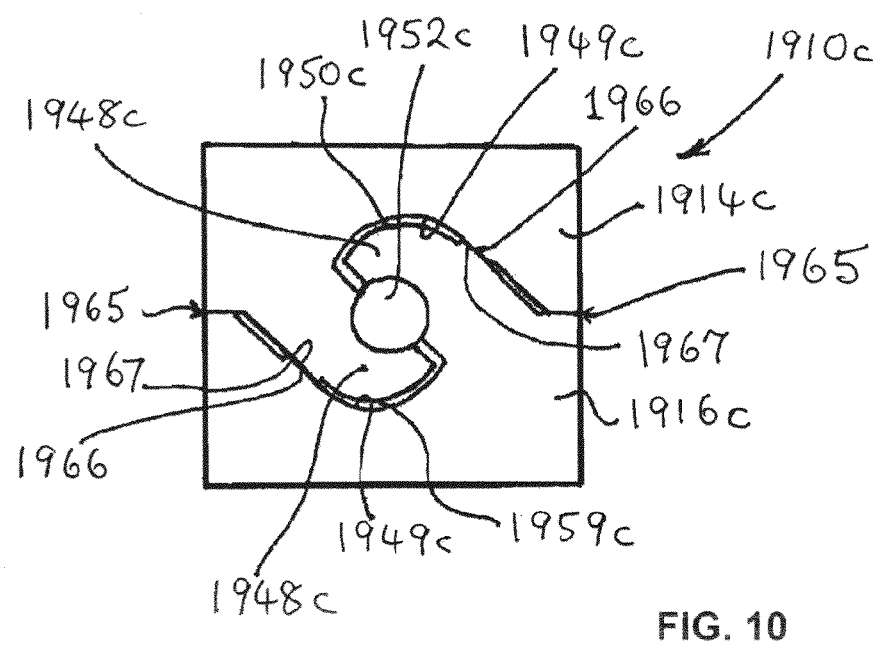
Figure 14:
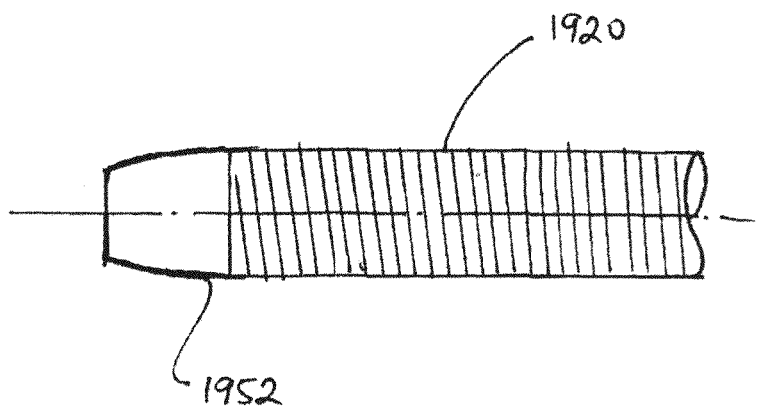
Figure 15:
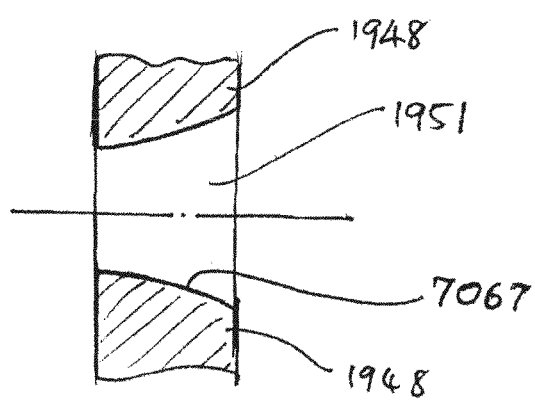
Figure 16:
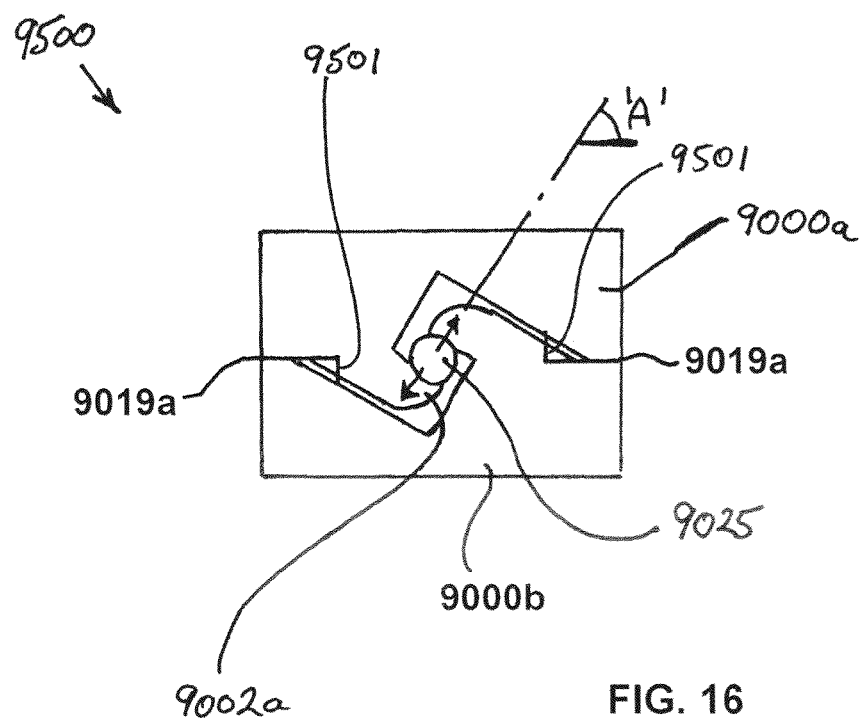
Figure 17:
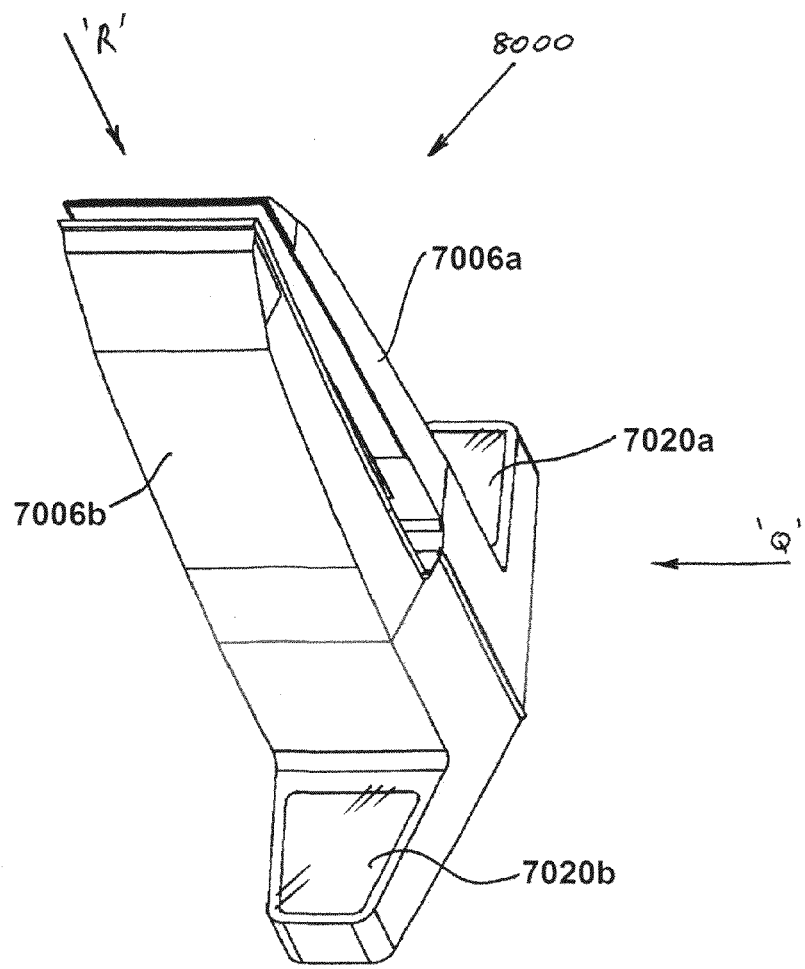
Figure 18:
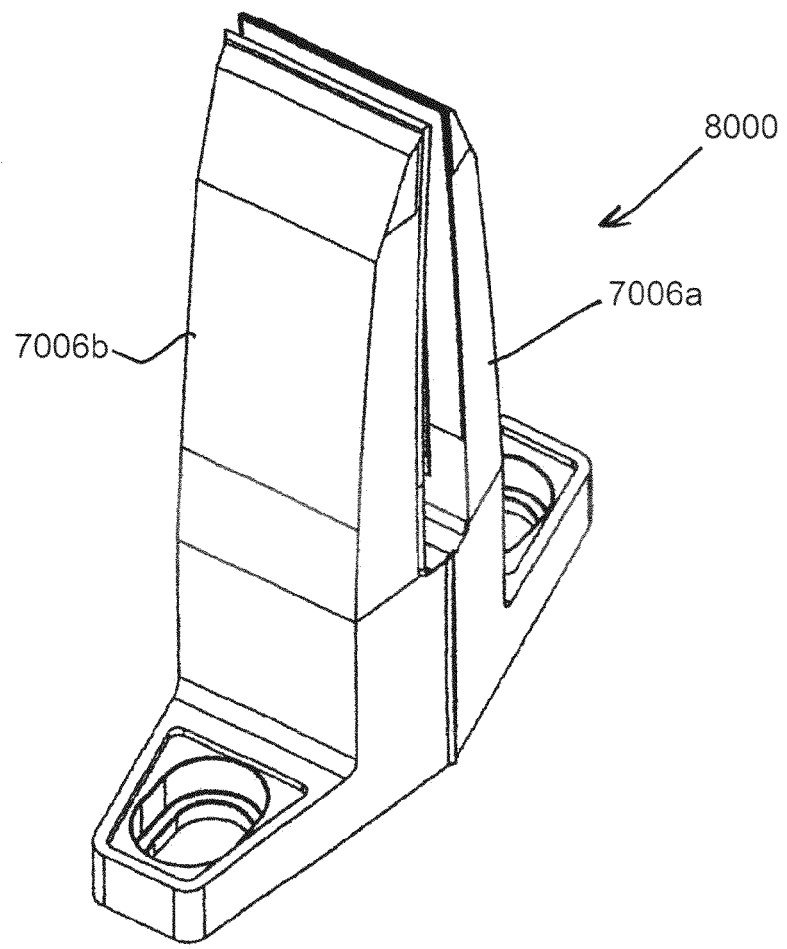
Figure 22:
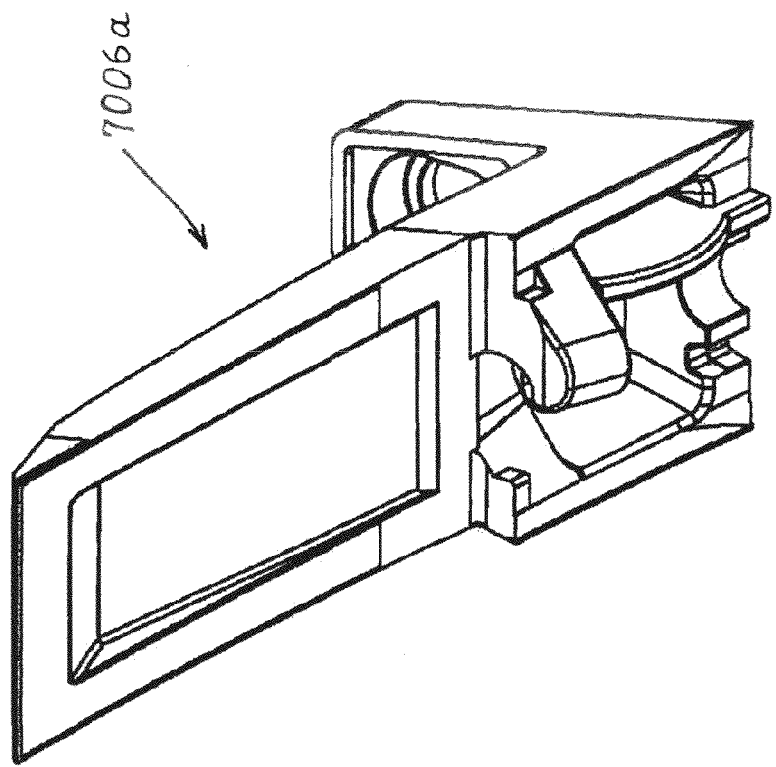
Figure 23:
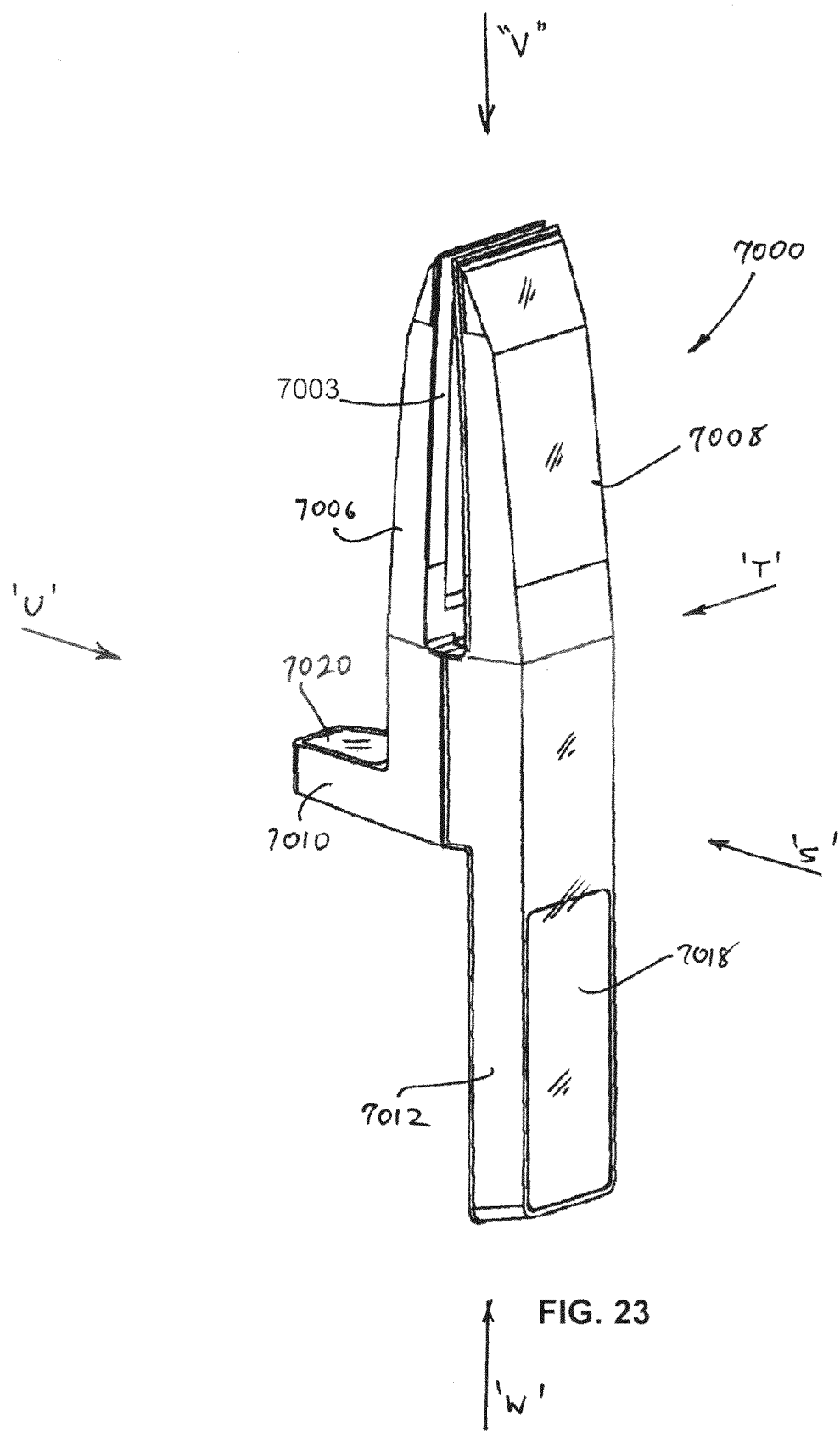
Figure 24:
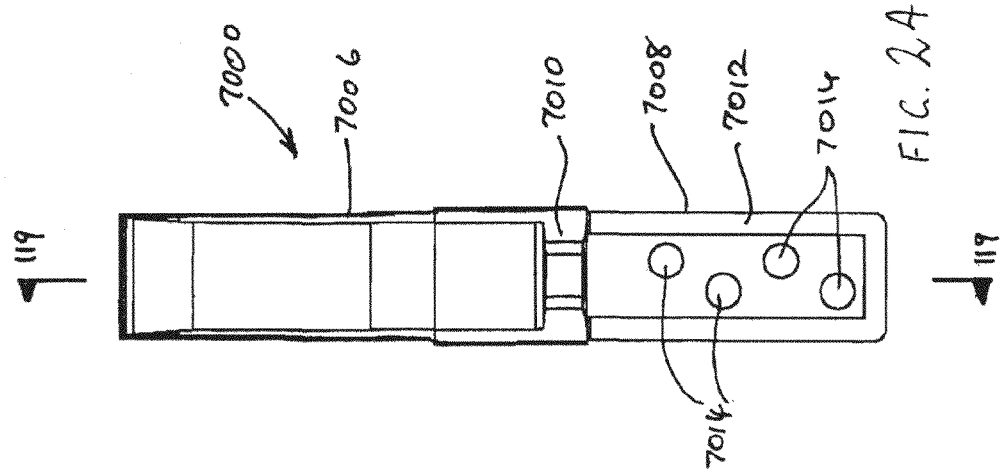
Figure 25:
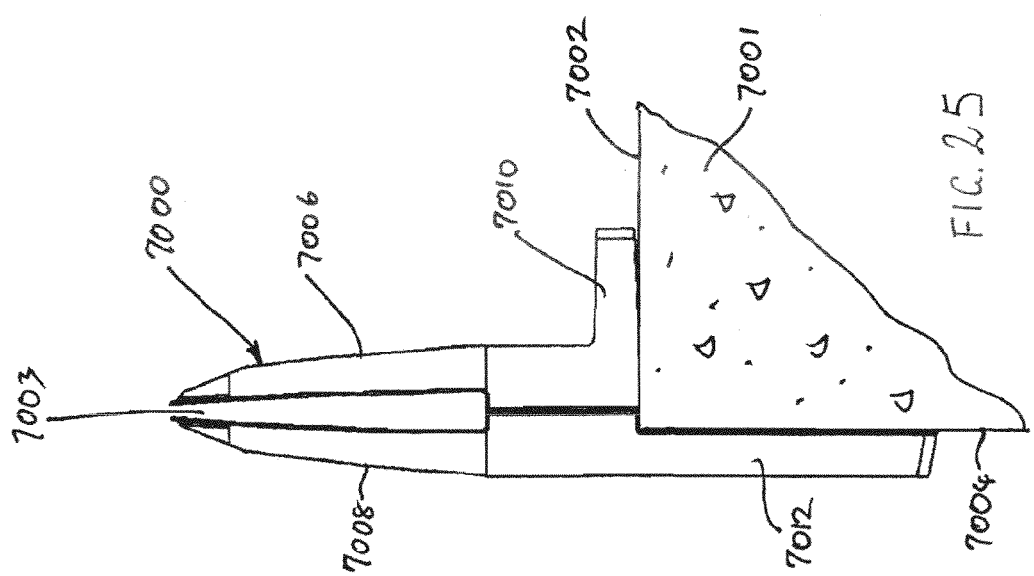
Figure 26:
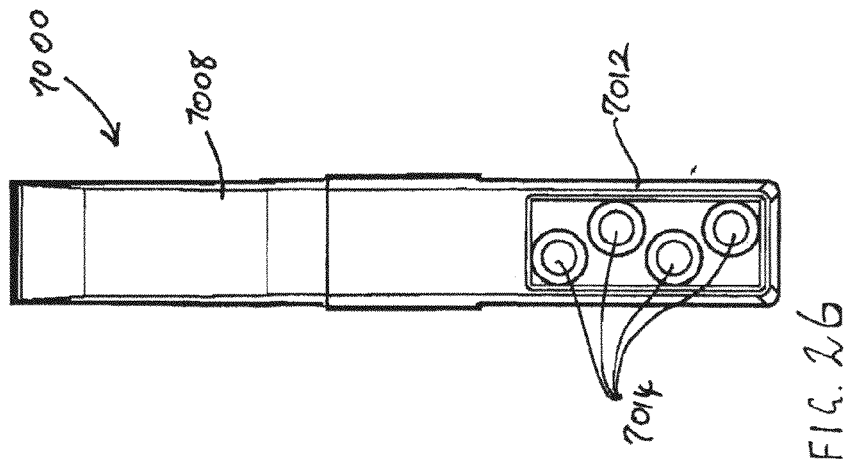
Figure 31:
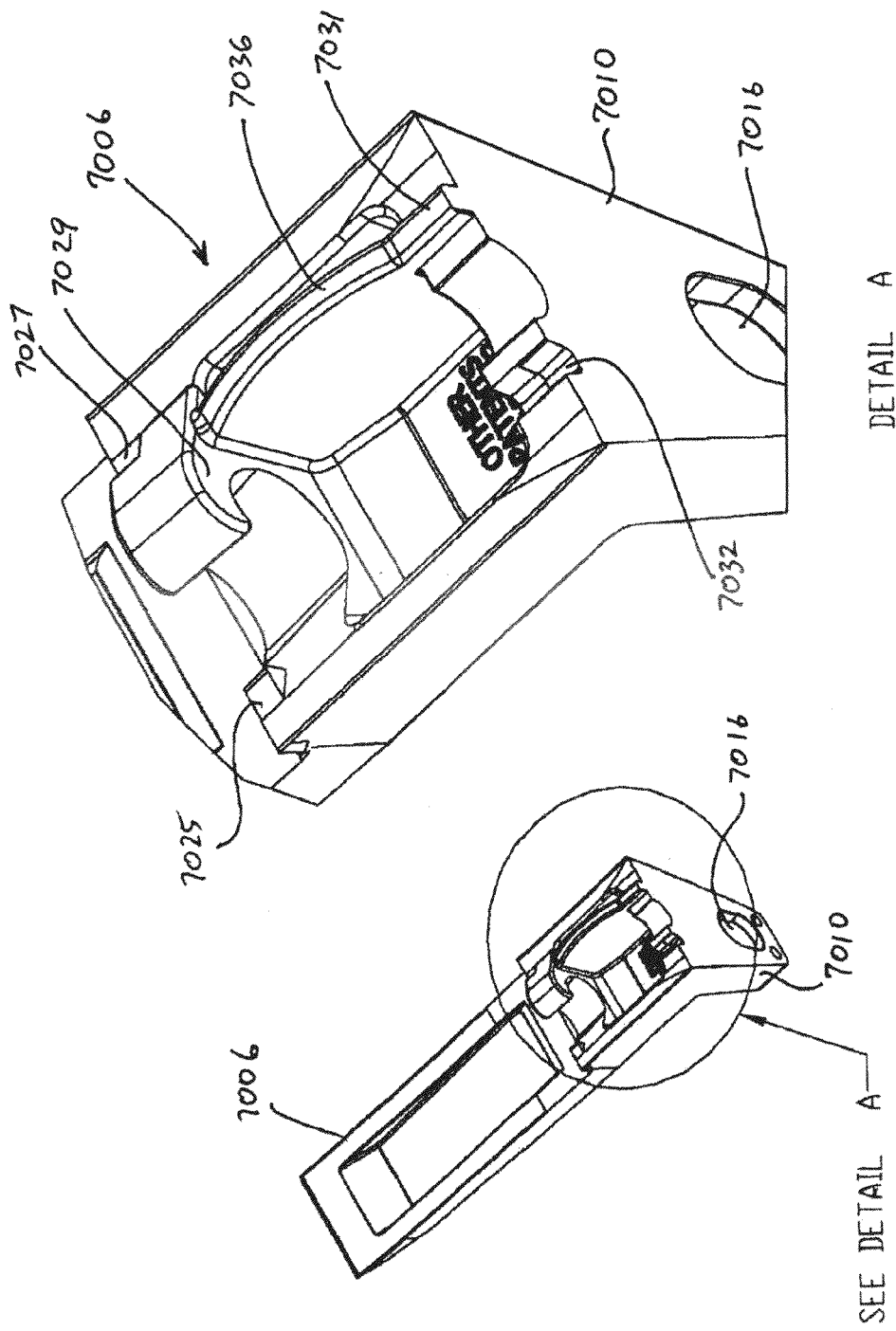
Figure 32:
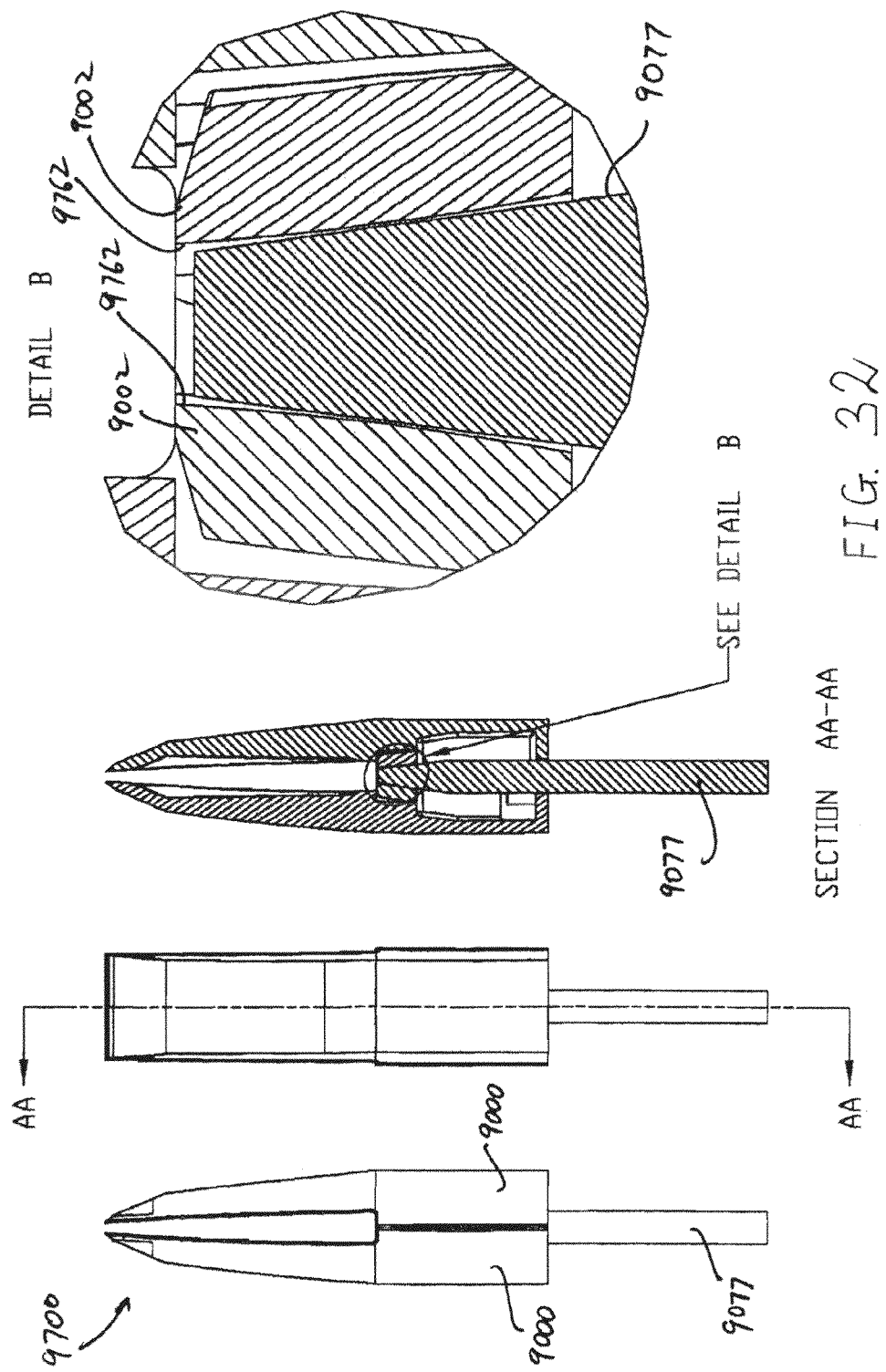
Figure 33:
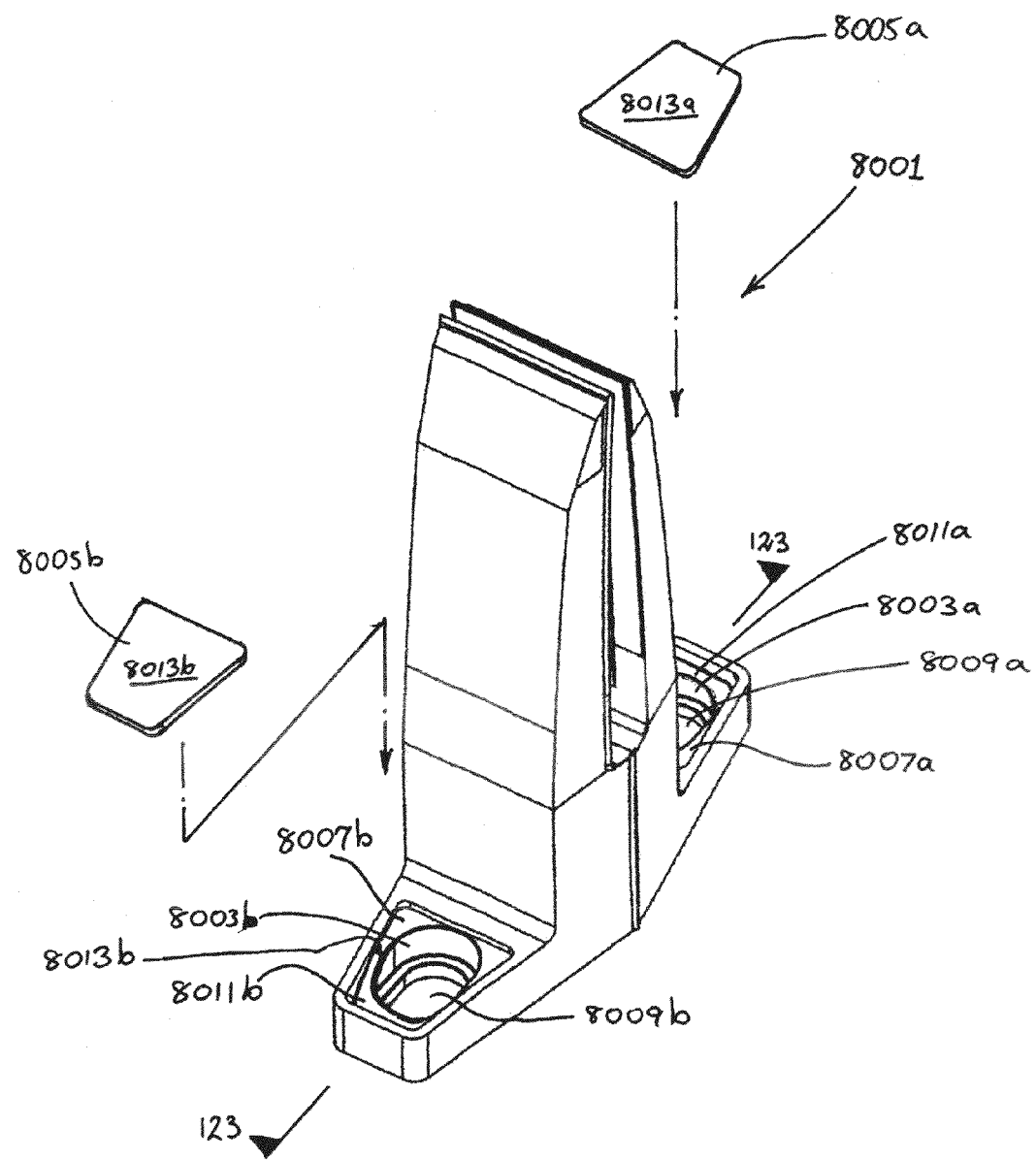
Figure 34:
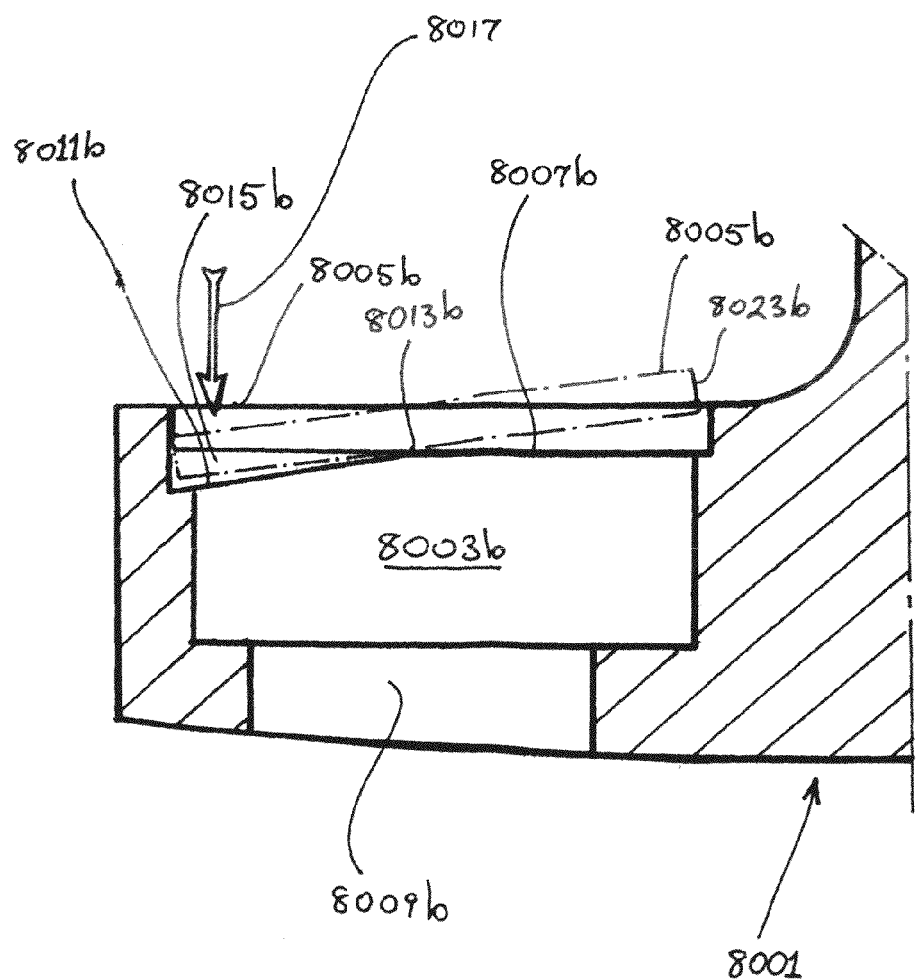
Figure 35:
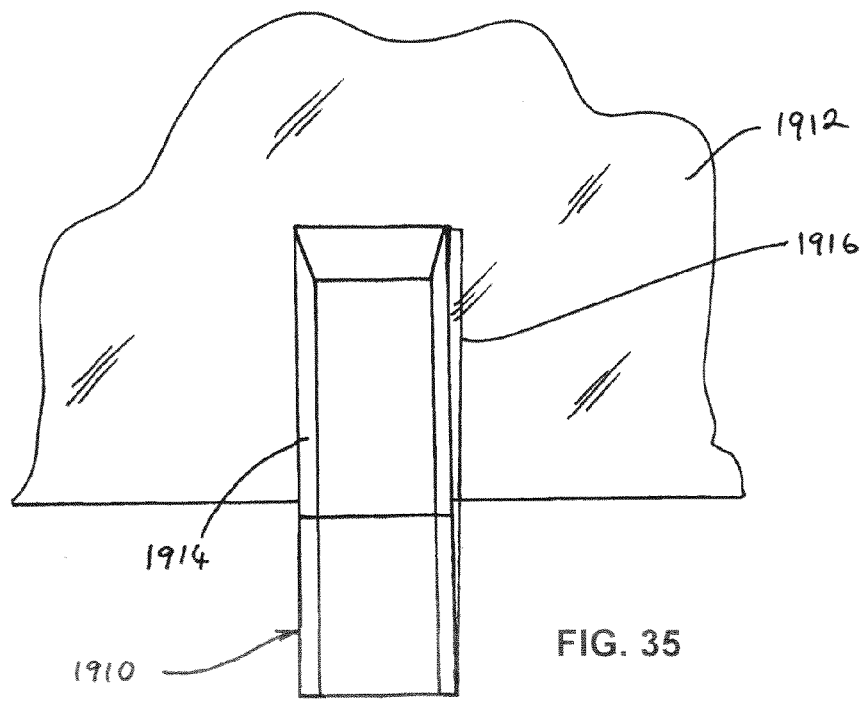
Figure 36:
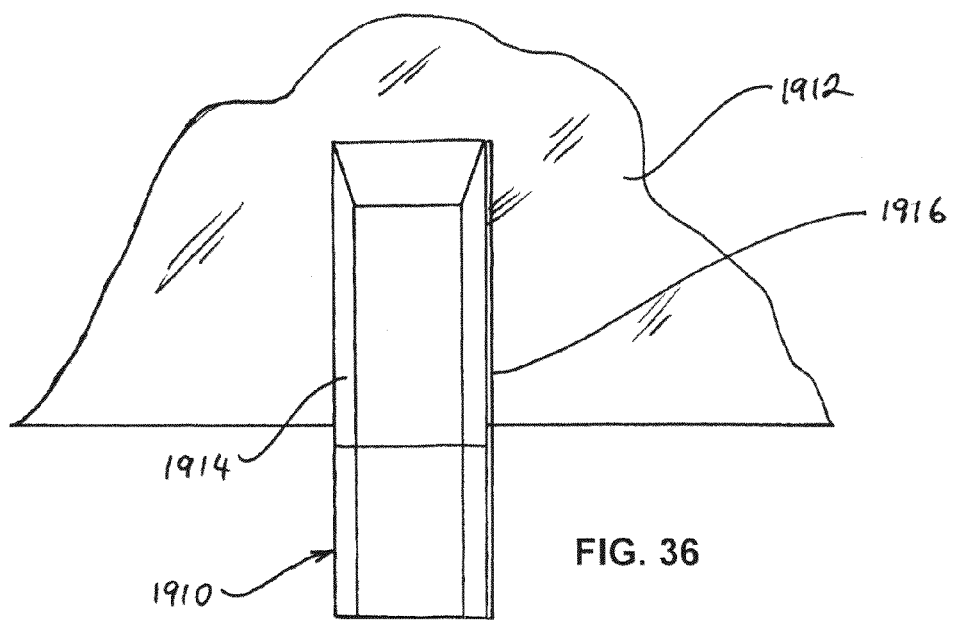
Figure 37:
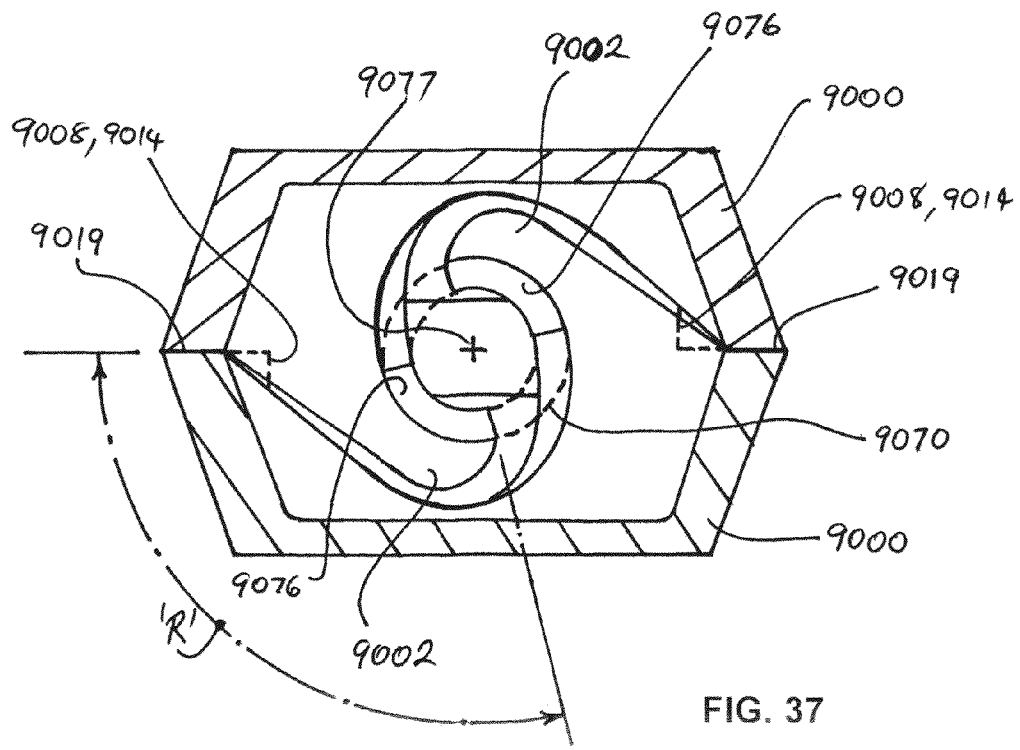
Figure 38:
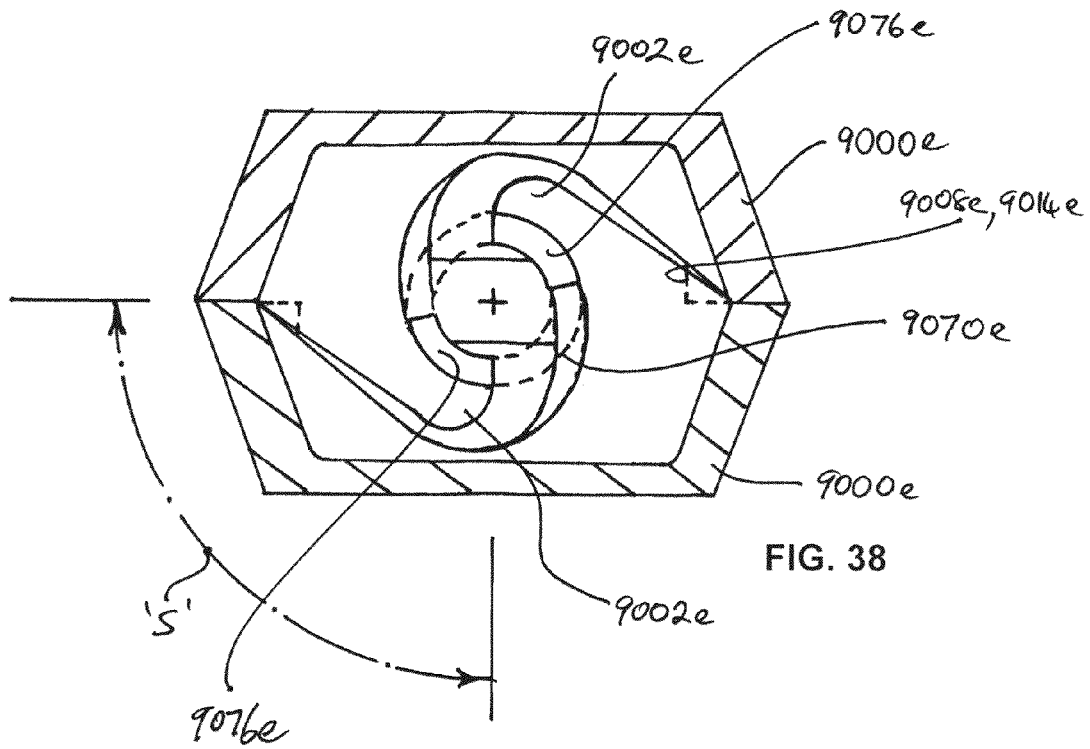
Figure 39:
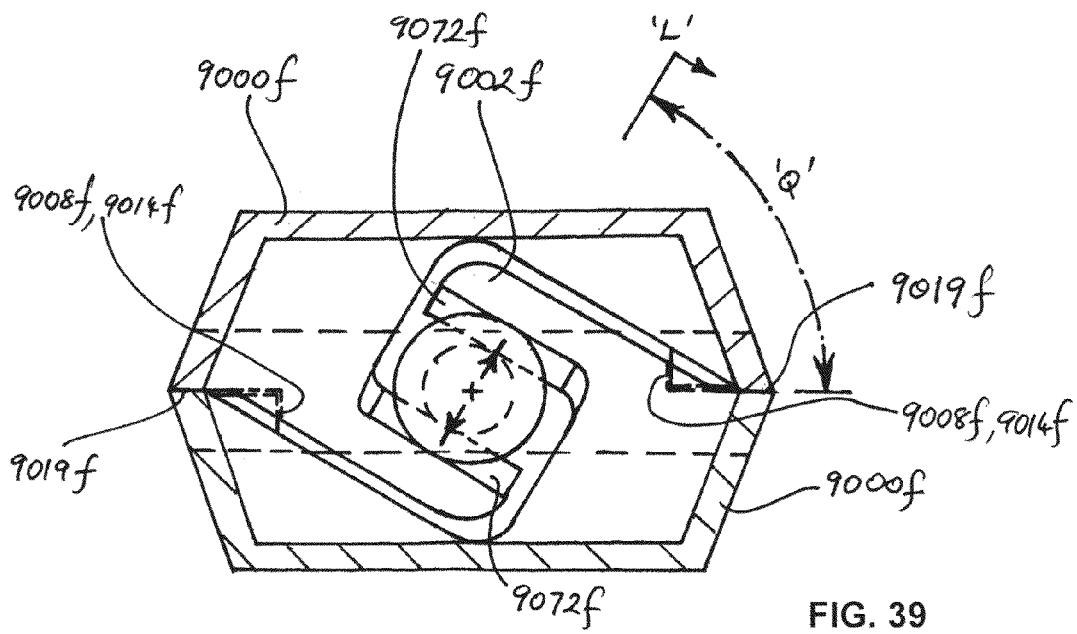
Figure 40:
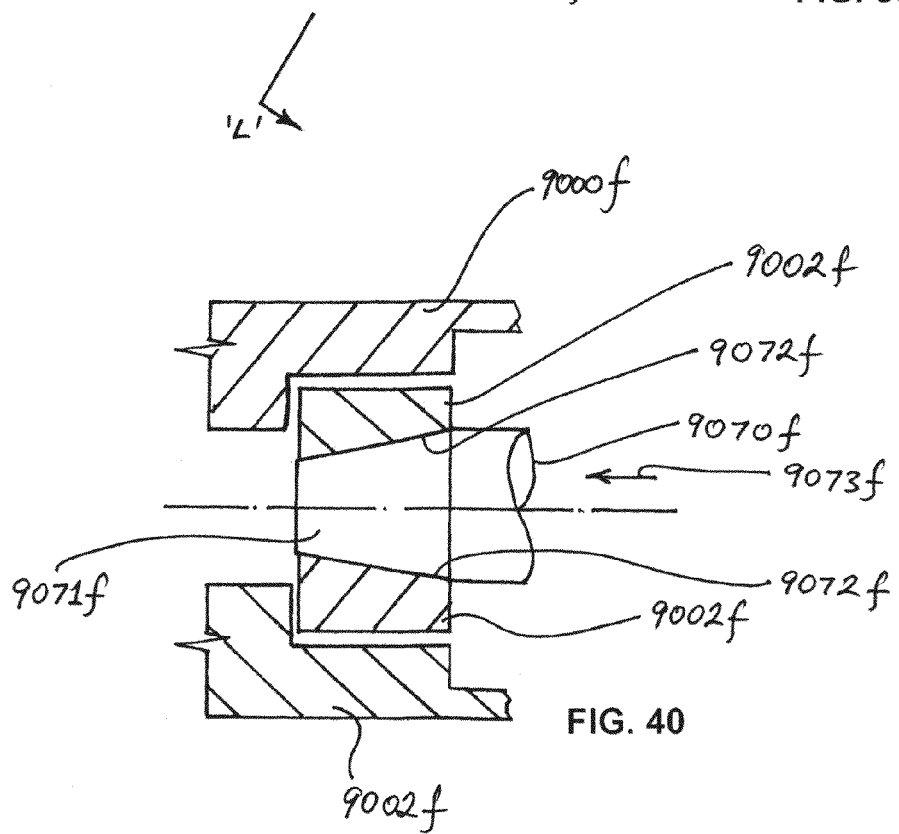

FIG. 7 comprises five cross-sections marked (*a*)-(*e*) of the clamp half shown in FIG. 6, the sections being taken at the stations marked (*a*), (*b*), (*c*), (*d*) and (*e*) respectively extending between FIGS. 5 and 6;

FIG. 8 is a cross section through a modified version of the clamp shown in FIG. 2, the section being equivalent to that of FIG. 7(*b*);

FIG. 9 is a cross section (not to scale) through a further modified version of the clamp shown in FIG. 2, the section being equivalent to that of FIG. 7(*b*);

FIG. 10 is a cross section through a modified version of the clamp shown in FIG. 2, the section being equivalent to that of FIG. 7(*b*);

FIG. 11 is a perspective view of a clamp half according to the invention;

FIG. 12 is a further perspective view of the clamp half shown in FIG. 11;

FIG. 13 is a detail ("A") of FIG. 12;

FIG. 14 is a side view of portion of a component shown in FIG. 4, modified according the present invention;

FIG. 15 is a partial cross-sectional view through the prior art clamp as shown in FIG. 5 taken at station "X-X" and between stations (*a*) and (*b*) with the clamp parts shown being modified according to the present invention;

FIG. 16 is a simplified and schematized cross-section of a clamp made using two clamp halves of the type shown in FIG. 11;

FIG. 17 is a perspective view of a deck-mountable clamp made according to the invention;

FIG. 18 is a perspective view of the clamp of FIG. 17 with some parts removed;

FIG. 19 is a view of the clamp of FIG. 17 looking in the direction of arrow "R";

FIG. 20 is a view of the clamp shown in FIG. 17 looking in the direction of arrow "P";

FIG. 21 is a view of the clamp shown in FIG. 17 looking in the direction of arrow "Q", the clamp being mounted to a deck;

FIG. 22 is a perspective view of one clamp half of the clamp shown in FIG. 17;

FIG. 23 is a perspective view of a further clamp according to the invention;

FIG. 24 is a view of the clamp of FIG. 23 seen looking in the direction of arrow "U";

FIG. 25 is a view of the clamp of FIG. 23 seen looking in the direction of arrow "T", the clamp being shown mounted to a slab edge;

FIG. 26 is a view of the clamp of FIG. 23 seen looking in the direction of arrow "S" with a cover plate removed;

FIG. 27 is a view of the clamp of FIG. 23 seen looking in the direction of arrow "W";

FIG. 28 is a view of the clamp of FIG. 23 seen looking in the direction of arrow "V", and with a cover plate removed;

FIG. 29 is a perspective view of one clamp part of the clamp shown in FIG. 23 with a portion shown as an enlarged detail;

FIG. 30 is a sectional view of the clamp as shown in FIG. 24, the section being taken at the station "119-119";

FIG. 31 is a perspective view of another clamp part of the clamp shown in FIG. 23 with a portion shown as an enlarged detail;

FIG. 32 comprises two views of a clamp made with two clamp halves of the type shown in FIG. 11, and a section of that clamp with an enlarged detail of that section;

FIG. 33 is an exploded perspective view of a still further clamp according to the invention;

FIG. 34 is a partial cross-sectional view of the clamp shown in FIG. 33, the section being taken at station "123-123" of FIG. 33;

FIG. 35 is an elevation of a clamp secured to a glass panel, looking in a direction normal to the panel, with one clamp half in angular misalignment relative to the other clamp half;

FIG. 36 is an elevation of a clamp secured to a glass panel, looking in a direction normal to the panel, with one clamp half in lateral misalignment relative to the other clamp half;

FIG. 37 is a cross-section of two of the clamp halves of the type shown in FIG. 13, with some hidden lines omitted, in the relative positions they would occupy in an assembled clamp, the cross-section of each clamp half being taken at station "J-J" and looking in the direction of arrow "K";

FIG. 38 is an identical view to FIG. 37, of two assembled clamp halves, with one difference namely that the two clamp halves shown are modified versions of those shown in FIG. 13;

FIG. 39 is an identical view to FIG. 37, of two assembled clamp halves, with one difference namely that the two clamp halves shown are modified versions of those shown in FIG. 13;

FIG. 40 is a partial cross-sectional view of the assembly of two clamp halves shown in FIG. 39, the cross-section being taken at station "L-L".

DETAILED DESCRIPTION OF PREFERRED EMBODIMENTS

Clamps will be described below that are suitable for use as the clamps 4 in fence 1, using glass, transparent plastics or other sheet-type materials for the panels 2. Purely for convenience, glass panels only will be discussed, but this is not intended to imply any limitation on the panel materials to which any of the clamps may be applied. An important class of extra but related application for at least some of the clamps to be described is to the securing of hand- and other rails to panels of glass and other materials of balustrades and the like.

The approach taken is to firstly describe a prior art clamp 1910 and then describe an improvement to that type of clamp according to the present invention.

There will first be described a clamp 1910 that uses the principle of two clamp halves (between which a panel may be clamped) that are held in relative positions for clamping by means of a further component that interlocks with both parts.

FIGS. 2 and 3 show clamp 1910 assembled and supporting a glass panel 1912. Clamp 1910 has two identical clamp halves 1914 and 1916, and these are held together (i.e. to interlock) in use of clamp 1910 by a nut and bolt assembly 1918 of which only bolt 1920 is visible. Bolt 1920 may be used to secure clamp 1920 to a structure or to a suitable ground anchor (not shown), or its lower part (shown protruding in FIGS. 2 and 3) may itself have an anchoring function if for example clamp 1920 is grouted into a hole (not shown) in a ground mass (not shown) or the like.

Panel 1912 is held between elastic pads 1922 and 1924 that lie against opposing faces of panel 1912 and against clamping faces 1926 and 1928 of clamp halves 1914 and 1916 respectively. Below panel 1912 is an elastic pad 1930.

FIG. 94 shows clamp half 1914. A cavity 1932 is formed in an upper portion of clamp half 1914 to reduce the clamp weight and the quantity of metal required to make it, although cavity 1932 is optional. (Clamp halves 1914 and 1916 may be made by casting, possibly investment casting, in stainless steel or other suitable material, although this is not to preclude the possibility of other manufacturing methods being used).

A lower portion 1940 of clamp half 1914 has a face 1936 that on assembly of clamp 1910 faces the corresponding face of identical clamp half 1916. A cavity 1938 is defined within lower portion 1940. An approximately semicircular cutaway 1942 is defined in a bottom wall 1944 of lower portion 1940.

Within cavity 1938 there is a formation 1946 whose function when clamp 1910 is assembled is to prevent rotation of nut 1921 of assembly 1918. At the top of cavity 1938 a formation 1948 extends outward beyond face 1936. Seen from above, formation 1948 has a shape like a hook or a breaking wave, and a surface 1949 defines a wave-trough shape in front thereof, as can best be seen in cross-sections (a) and (b) of FIG. 7. (Note that these cross-sections are as seen by an observer looking downwards, as indicated by arrows on the dotted lines showing the sectioning stations (a)-(e) extending between FIGS. 5 and 6.

When clamp halves 1914 and 1916 are assembled together, the two formations 1948 nest together as shown in cross-sections (a) and (b) of FIG. 7, each of the two formations 1948 being received in the trough-like recess defined by a surface 1949 of the other part, and on assembly of clamp 1910 together define an approximately circular-section opening 1951 between them. Opening 1951 decreases in diameter from the bottom of formations 1948 to the top of formations 1948 so that when a tapered portion 1952 of bolt 1920 advances into opening 1951 those parts of formations 1948 on opposite sides of portion 1952 move in opposite directions thus pulling faces 1926 and 1928 towards each other (and therefore clamping therebetween the panel 1912).

To assemble clamp 1910, nut/bolt assembly 1918 is engaged in one of the clamp halves (1914 for example) with bolt 1920 passing through cutaway 1942 and the two parts 1914 and 1916 are then positioned one against the other, tapering porting 1952 being received between the two formations 1948. Nut 1921 is located between and against the two formations 1946 which prevent it rotating as bolt 1920 is screwed upward (in the orientation shown in the Figures). The result is that as formations 1948 are urged outwardly by taper section 1952, faces 1926 and 1928 are drawn together, compressing pads 1922 and 1924 and clamping panel 1912. An external locknut (not shown) may if required also be provided on bolt 1920, to be tightened against the outer surface of wall 1944.

To balance the tendency of the upper ends (i.e. the ends remotest from formations 1948) of parts 1914 and 1916 to splay outwards, there is in assembled clamp 1910 compressive contact between parts 1914 and 1916 at their lower ends and/or between parts 1914 and 1916 and bolt 1920 and/or between nut 1921 and formations 1946.

The clamp 1910 as described above was disclosed by the present applicants in PCT International Publication No. WO 2010/146474. In that publication, several schemes were described by which the interlocking of parts 1914 and 1916 described above could be achieved. A first scheme, the one incorporated in clamp 1910 as shown in FIGS. 2 to 6, is shown in FIG. 7 (*a*) and (*b*). Item number 1950 refers to an area on the "crest" of formation 1948. It is possible with suitable proportioning of parts 1914 and 1916 to arrange that area 1950 of one formation 1948 actually contacts the trough surface 1949 of the other part, so that once a certain degree of engagement of portion 1952 of bolt 1920 is achieved, the two parts 1914 and 1916 lock together. There may be gaps 1947 at the sides of the assembled clamp. With this scheme, the spacing between faces 1926 and 1928 can be very precisely specified and held, so that overtightening of the clamp on panel 1912 can be avoided.

Another possible scheme can be described by reference to FIG. 8. FIG. 8 shows a section through a clamp 1910*a* having parts 1914*a* and 1916*a* corresponding to parts 1914 and 1916 of clamp 1910. (Similarly, an item number in FIG. 8 with a suffix "a" denotes a part equivalent to an element of clamp 1910 with the same item number excluding the "a".) FIG. 8 is intended to be directly equivalent to FIG. 7(*b*) although not to scale. Clamp 1910*a* has a different interlocking arrangement, inasmuch as each surface 1950*a* remains clear of adjacent surface 1949*a*. Bolt portion 1952*a* pushes formations 1948*a* apart, but movement together of parts 1914*a* and 1916*a* ceases when there is contact at points 1964. In this scheme, formations 1948 are subject to bending stress once the clamp 1910*a* is assembled, and parts 1914*a* and 1916*a* press against each other at points 1964. As with clamp 1910, the spacing of the clamping faces (not shown) can be precisely specified and held.

Still another possible interlocking scheme can be described by reference to FIG. 9. FIG. 9 shows a section through a clamp 1910*b*, with a third interlocking scheme. Clamp 1910*b* is generally the same as clamps 1910 and 1910*a* except for this third interlocking scheme, and the suffixes "b" indicate parts corresponding to equivalent parts similarly numbered (except without the "b") in the description of clamp 1910. In this interlocking scheme, portion 1952*b* pushes formations 1948*b* apart as before, but surfaces 1949*b* and 1950*b* remain apart upon assembly and also there are gaps 1951 between parts 1914*b* and 1916*b*. In this scheme, the distance between the clamping faces is not precisely set, but instead the clamping force on a panel such as 1912 held between parts 1914*b* and 1916*b* depends on the distance to which bolt portion 1952*b* enters into the space between formations 1948*b*. This arrangement is not preferred as overtightening is possible, and this is particularly important where glass panels are to be clamped.

A fourth possible interlocking scheme can be described by reference to FIG. 10. FIG. 10 shows a section through yet another clamp 1910*c*, with a fourth interlocking scheme. Clamp 1910*c* is generally the same as clamps 1910, 1910*a* and 1910*b* except for its interlocking scheme, and the suffixes "c" indicate parts corresponding to equivalent parts similarly numbered (except without the "c") in the description of clamp 1910. In this interlocking scheme, portion 1952*c* pushes formations 1948*c* apart as before, and surfaces 1949*c* and 1950*c* remain apart. However, surfaces 1966 on the formations 1948*c* and surfaces 1967 about each other, together with surfaces 1965. This scheme leaves formations 1948*c* under bending stress when portion 1952*c* is fully home, but this is believed acceptable for such materials as stainless steel (for example) which do not exhibit significant creep over time and under load. This scheme was developed to provide improved alignment of the two clamp halves such as 1914*c* and 1916*c* after clamp assembly on completion of the assembly of the two parts.

However, each of these schemes has proven in practice to be only partly satisfactory, in each case for at least one of two reasons, namely ease of manufacturing and the ability to assemble a clamp with two clamp halves accurately in registration with each other and without distortion or unwanted displacement of any gaskets used between the clamping faces and a panel being clamped. What is meant by registration is that if two identical clamp halves (such as 1914 and 1916 of clamp 1910) are assembled together in perfect registration, a drawing that is an elevation of the assembled clamp when seen looking in a direction normal to a clamped glass panel would show only one clamp half, the other being precisely obscured so as not to appear in the elevation. FIGS. 35 and 36 are elevations of clamp 1910 secured to a panel 1912, looking in a direction, perpendicular to the plane of panel 1912, where registration is not correct. Angular misalignment is shown in FIG. 35 and would mean that at least one wedge-shaped part of the further clamp half (here 1916) would be visible in the elevation and lateral misalignment, shown in the similar view of FIG. 36, would mean that some of the further clamp half (here again 1916) would be visible along the whole of its length. Lack of correct registration means that there is some combination of lateral and angular misalignment of the clamp halves on opposite sides of the panel that clamp the panel (1914 and 1916 in these examples).

The scheme of FIG. 10 has been found able to give good registration of the two clamp halves when they are in their final positions. However, during the assembly process, in which the two clamp halves 1914*c* and 1916*c* are assembled together with member 1952*c* and moved into engagement with a panel to be clamped, any initial misalignment of the two clamp halves may not be corrected until very late in, or the very end of, the process of their movement towards each other. The result may be distorting of rubber (or other) gaskets or spacers between the panel and the clamp halves 1914*c* and 1916*c* notwithstanding accurate final registration of the two halves. This can be very difficult to fix.

A surprisingly effective way in which this problem can be alleviated in clamps of the above described general type will now be described. FIG. 11 shows a first clamp half 9000 of two identical clamp halves that can be used in a clamp similar in its principle of operation to clamp 1910, so that separate explanation of a clamp made using clamp halves 9000 is not required, except as set out below. FIGS. 12 and 13 show further partial views of clamp half 9000. Face 9001 is a clamping surface analogous to face 1926 in clamp 1910 and 9003 is an axis along which an elongate locating component, such as a bolt with a tapered portion (not shown in FIG. 11, but analogous to bolt 1920) moves during assembly and extends in the assembled clamp. Clamp half 9000 has a wave- or hook-shaped first formation 9002. This first formation and an identical second formation of the identical second clamp half perform the same function as formations 1948 in clamp 1910: that is, as the locating component is moved lengthwise during assembly of the clamp the tapered portion moves between the first (9002) and second formations whereby to urge portions of them apart so that the first clamping surface 9001 and the second clamping surface comprised in the second clamp half move towards each other whereby to clamp a panel between them. On completion of this process, clamp half 9000 and the second clamp half arrange themselves generally as shown in FIG. 8 for clamp 1910, namely with formation 9002 and its identical counterpart clear of each other generally as shown in FIG. 8 and contact between pairs of side wall surfaces 9019. However according to the first invention there is one important difference between clamp 1910 and a clamp made using two clamp halves 9000, set out below.

A recess 9004 is formed in outer sloping face 9006 of formation 9000 and has a flat surface 9008 that is at least approximately parallel to bolt axis 9003 and precisely or nearly perpendicular to the face of a glass panel that is held between the two faces 9001 by the assembled clamp. Also provided is a triangular formation 9010 upstanding from a surface 9012. Formation 9010 has a flat surface 9014 that is precisely or nearly parallel to wall 9008. Further, formation 9010 and recess 9004 are so positioned and proportioned that the formation 9010 of each clamp half is received in the recess (the same as 9004) of the other clamp half when two clamp halves 9000 are assembled together for use. Surfaces 9014 and 9008 act as guide surfaces while a panel is being clamped. Provided a surface 9008 of one clamp half abuts the surface of the other half corresponding to surface of 9014 during the clamping process, relative displacement in one direction of the two clamp halves from their intended positions is prevented at least in the vicinity of those guide surfaces 9014 and 9008. That one direction is perpendicular to the movements of both the clamping surfaces and the locating component is prevented at least in the vicinity of those guide surfaces.

It will be realized that relative movement in the opposite direction is not prevented by such guide surface abutment. However, with suitable choice of the geometry of the two formations 9002 and a tapered bolt 9025 pushing them apart, a degree of sideways force is developed either continuously as formation 9002 and its counterpart in the other clamp half are urged apart, or if there is lateral misalignment. This pushes surfaces 9008 and 9014 into contact and so long as that force exists, holds them in contact. In this way, movement of the two clamp halves 9000 out of registration in either direction in the plane of formations 9010 and recess 9004 is prevented or alleviated, at least in the vicinity of the guide surfaces 9008 and 9014. This is explained further below.

Also shown in FIG. 11 are a male formation 9020 and female recess 9022 so positioned and proportioned that the female recess 9022 of one clamp half 9000 receives the male formation 9020 of another clamp half 9000 when two clamp halves 9000 are assembled together. With suitably close fitting of formations 9020 in recesses 9022, these too can assist in providing good registration and alignment of two assembled clamp halves 9000. However, it is believed that having cooperating formations 9010 and recesses 9004 longitudinally at or close to the formations 9002 and working together due to the side force developed between formation 9002 is more important to good registration and alignment of the two clamp halves.

FIG. 16 is a schematic diagram illustrating the principle involved in a clamp 9500 made on the principle described above by reference to clamp half 9000. It is a much-simplified and schematized cross-section normal to the length of elongate locating component (eg bolt) 9025 serving the purpose that is served by bolt 1920 in clamp 1910. The section shows what is happening at the location (longitudinally along the length of component 9025) of the two formations 9002 (represented by items 9002a and 9002b) in a clamp 9500 assembled from two clamp halves 9000 (represented by items 9000a and 9000b). Similarly to the arrangement shown for clamp 1910 in FIG. 8, formations 9002a and 9002b are urged apart by a bolt 9025 tapered in a direction normal to the page (i.e. longitudinally of the clamp 9500). The effect of this urging apart is to draw clamp halves 9000a and 9000b together, with contact occurring at mating surface pairs 9019a (corresponding to sidewalls 9019 of clamp half 9000) and at mating surface pairs 9501, which is intended to schematically represent the two pairs of mating surfaces 9014 and 9008 of clamp half 9000. Depending on the angle "a", a sideways-directed thrust is developed that urges the mating surfaces 9501 together, so that during assembly of clamp 9500, registration of the two clamp halves 9000a and 9000b is maintained due to sliding abutment of the guide surface pairs 9501. Formations equivalent to 9020 and 9022 (not shown in FIG. 16, and at a different longitudinal location on clamp 9500) assist in maintaining registration and alignment of the two clamp halves 9000a and 9000b. The side thrust can be varied by suitable choice of angle "a" and by suitable shaping the formations 9002a and 9002b and controlling their arcs of contact with bolt 9025 as set out below. More detailed information on obtaining the side thrust to maintain registration during clamp assembly is now given, by reference to FIGS. 37-40.

FIG. 37 is a cross-section of two of the clamp halves 9000, with some hidden lines omitted, in the relative positions they would occupy in an assembled clamp, the cross-section of each clamp half being taken at station "J-J" and looking in the direction of arrow "K" shown in FIG. 13. FIG. 38 is the same in content and viewpoint as FIG. 37 except that clamp halves 9000e the same as clamp halves 9000 except for modified versions 9002e of formations 9002 are shown.

FIG. 39 is also the same as the same in content and viewpoint as FIG. 37 except that clamp halves 9000f that are the same as clamp halves 9000 except for further modified versions 9002f of formations 9002, are shown. The arrangement of FIG. 39 is treated first. An elongate locating component 9070f, seen in cross-section, is shown schematically only, as two circles representing the larger and smaller diameters at the ends of a linearly tapered end portion 9071f. Each formation 9002f has a flat surface 9072f. The two flat surfaces converge in the direction of advance of locating component 9070f shown by arrow 9073f (FIG. 40), and are inclined to the mating side surfaces 9019f (corresponding to surfaces 9019 of clamp half 9000) as shown by angle "Q" between a perpendicular to the surface 9072f and that plane.

If angle "Q" were to be 90 degrees, then as component 9070f advanced, the contact forces between it and surfaces 9072f would be perpendicular to the plane of surfaces 9019f and, although the two clamp halves 9000f would be drawn together as required, there would be no urging together of the pairs 9008f and 9014f of guide surfaces. Hence any initial lateral misalignment between clamp halves 9000f (i.e. across the page as FIG. 39 is drawn) would not be corrected. However, if "Q" is less than 90 degrees as shown, a side thrust is generated and the guide surface pairs 9008f and 9014f are drawn together and held together as component 9070f advances towards its final position. As the surfaces 9072f move apart, the lines of contact between them and tapered portion 9071f move also.

Although usable, the arrangement in FIGS. 39 and 40 is not preferred as there is line contact between surfaces 9072f and tapered portion 9071f of component 9070f.

In FIGS. 37 and 38, locating component 9070 is omitted, but the larger and smaller diameters of the ends of its linearly tapered portion are shown in dotted lines. Formations 9002 have conical surfaces 9076, that when component 9070 is advanced to its final position are designed to abut the tapered conical surface of component 9070. That is, line contact (as in the arrangement of FIG. 39) is avoided in favour of contact over significant surface area. It is thought that before this final state is reached, when component 9070 is advancing between, and pushing apart, formations 9002 the point (or line) of contact between each surface 9076 and component 9070 will vary according to the remaining gap between mating pairs of surfaces 9019 and any lateral misalignment, but that sidethrust will be generated and guide surface pairs 9008 and 9014 urged into abutment, so long as the contact surface 9076 is mostly on the side of the axis 9077 of component 9070 that is closer to the recess 9004 that contains guide surface 9008. This appears to apply even if the conical surface extends more than 90 degrees (as shown by angle "R" in FIG. 37) around component 9070 from the plane of planes 9019.

However, it is preferred that angle "R" be equal to or less than 90 degrees, as shown by the angle "S" in FIG. 38. This is not only to ensure that any sidethrust generated by contact between component 9070 (or 9070e in the arrangement of FIG. 38) is in the direction required to bring the guide surface pairs (9008/9014, 9008e/9014e) into abutment, but also because it has been found that values of "R" less than 90 degrees make initial assembly of clamp halves such as clamp halves 9000 and a matching locating component easier.

Of course the conical surfaces 9076, 9076e, must extend sufficiently far around component 9070 or 9070e to ensure the thrust required to close the clamp on a panel is also generated.

Calculating the contact points (or lines) between a tapered locating component such as 9070 or 9070e and two conical surfaces such as 9076 or 9076e for specified degrees of misalignment and separation requires only geometry, and does not require any inventive step. By such means, the necessary angular extent of the conical surfaces can be determined for any practical clamp half design.

The sizes and proportions of recess 9004 and formation 9010 are desirably chosen so that the two clamp halves 9000 are forced into such good alignment and registration during assembly and before the two clamps assume their final positions, and preferably before any significant distortion or lateral movement of gaskets (not shown) between the panel being clamped and faces 9001 (not shown) can occur.

Formations 9010 are not intended to "bottom" in recesses 9004 in use, i.e. face 9011 of formation 9010 is not intended to contact face 9017 of recess 9004. Rather, it is intended that completion of assembly together of two clamp halves 9000 be characterized by contact between side surfaces 9019.

The combination of this locking scheme and the use of formations 9010 and recesses 9008 is surprisingly advantageous not only because of the assembly advantages described above, but because it has manufacturing advantages also, compared to the schemes described by reference to FIGS. 8, 9 and 10. It has been found difficult to obtain satisfactorily accurate assembly with normal manufacturing tolerances, including those applicable to investment casting, which can be used for the clamp parts. Specifically, with the scheme of FIG. 10, getting accurately simultaneous contact between surfaces 1966 and 1967 as well as surfaces 1965 has been difficult. And with the scheme of FIG. 9, getting satisfactorily small gaps 1951 has been difficult. The scheme of FIG. 7 proved similarly difficult to implement.

Despite the advantage of clamp half 9000 in this respect (it is similar for manufacturing purposes to the simple scheme of FIG. 8) some final adjustment after casting (If that forming method is chosen) using a grinder, possibly hand held, may nevertheless be required, but this is not particularly difficult as the formation 9010 in particular is readily accessible. Material can be ground off it easily if required, or it can be tapped with a hammer or the like to make a burr, effectively slightly changing its shape.

An alternative approach to proving improved registration and alignment of two clamp halves would be to provide on clamp half 9000, instead of formation 9010 and recess 9004, male and female locating formations (not shown) that are similar to formations 9020 and 9022 but located longitudinally near the "hook" formations 9002. The male locating formation of one clamp half would have only limited lateral clearance (hence freedom to move laterally) in its receiving female locating formation, so as to force two such clamp halves into registration at the locations of the formations 9002. However, in practice the need to provide some manufacturing clearance would limit the effectiveness of this scheme compared to that of clamp half 9000, including during the process of engagement of the two clamp halves, before they reach their final positions.

A further improvement may be incorporated in clamps such as clamp 1910 and clamps based on clamp halves such as clamp half 9000. This is explained here by reference to clamp 1910, but without any intended limitation to that clamp only. If the surfaces of formations 1948 that form opening 1951 and the surface 1952 of bolt 1920 are straight tapered, i.e. conical, in the parts that are engaged by bolt 1920 in use, contact between bolt 1920 and formations 1948 tends to be point contact, or at best line contact over short lengths, during engagement of the bolt 1920 in opening 1951, as there can be only one point at which accurate mating of male and female conical surfaces occurs. This can make for unpredictable movement during assembly. To alleviate this, the male surface 1952 of bolt 1920 that in use enters opening 1951, may be given a slightly "barrel" shape as shown in FIG. 14, instead of a simple conical shape. Alternatively, those parts of the female surfaces that form opening 1951 may be shaped with a correspondingly slight inward bulge along their length. This is shown at item 7067 in FIG. 15, where either of these measures is believed to offer more line contact and a better "feel" during assembly. This improvement could be applied to clamp half 9000. A bolt 9025 made to be used in assembling clamp halves 9000 could incorporate the improvement described above by reference to FIG. 14.

A further example of application of the new locking arrangement set out above will now be given.

FIG. 23 shows a clamp 7000 that can be mounted on an edge of a concrete slab 7001, or deck, beam or like structure, being secured by bolts or screws (not shown, and by way of example) to both an upward facing (typically horizontal) surface 7002 of that structure and a side face 7004 of that structure as shown in FIG. 25. Clamp 7000 has two clamp halves 7006 and 7008 that clamp together using the scheme described above in relation to clamps made using clamp halves 9000 and that hold a panel (not shown) in a gap 7003. Clamp halves 7006 and 7008 are identical in respect of the parts that effect their clamping together (see below) but otherwise differ from each other. Clamp half 7006 has a flange 7010 that extends laterally and that in use is placed immediately above surface 7002 (possibly with a gasket (not shown) or layer of sealant interposed between the surface 7002 and the flange 7010), whereas clamp half 7008 has a depending portion 7012 that in use lies against the side face 7004 (again with the possibility of a gasket or layer of sealant (not shown) being interposed).

Referring to FIGS. 29 and 31, the following items correspond to parts of clamp half 9000 as listed below:
   9004 corresponds to items 7026, 7027;
   9010 corresponds to items 7024, 7025;
   9002 corresponds to items 7028, 7029
   9020 corresponds to items 7030; 7031
   9022 corresponds to items 7032, 7033.

The locking arrangement for two clamp halves 9000 having been described above, it need not be repeated here.

One modification shown is ribs 7036, 7037 in clamp halves 7006 and 7008 respectively, which both strengthen the structure generally and act to prevent rotation of the nut (not shown, corresponding to nut 1921 of clamp 1910) on bolt 7022.

To secure clamp 7000 in place on slab 7001 (for example), suitable fasteners (such as bolts or screws, not shown) are passed horizontally through holes 7014 in depending part 7012, and others are passed vertically through slots 7016 in flange 7010, all being secured within slab 7001.

For enhanced appearance, clamp half 7008 is provided with a cover plate 7018 that once secured in place on clamp half 7008 lies flush with the surface of clamp half 7008 and conceals heads (not shown) of the fasteners that pass through that clamp half into slab 7001. Clamp half 7006 is also shown as provided with a cover plate 7020 that once secured in place on clamp half 7006 lies flush with the upper surface of flange 7010 and conceals heads (not shown) of the fasteners that pass through flange 7010 downward into slab 7001.

FIG. 30 shows the two clamp halves 7006 and 7008 assembled, using a bolt 7022 that serves the same purpose as bolt 1920 in clamp 1910. Bolt 7022 must be, and is, shorter than bolt 1920 so as to lie above a surface (such as 7002) on which clamp 7000 is mounted. It may have an Allen key-type recess (not shown) or a simple transverse slot to enable rotation by an Allen key or screwdriver when assembling the clamp halves 7006 and 7008 together. The clamp halves 7006 and 7008 are generally assembled together before mounting to the slab 7001 (or other structure).

Clamp 7000 has the advantage that it can increase the room available on a balcony deck or the like by allowing secure installation of panels at the very edge of the balcony or deck. Clamp 7000 is for at least this reason considered inventive in itself and may be provided not only with the new locking arrangement described herein, but any of the earlier ones described above.

It will be apparent that two clamp halves 7006 could be used to provide a clamp 8000 suitable for deck mounting. Such a clamp 8000 is shown in FIGS. 17 to 21, with two such clamp halves 7006a and 7006b. Cover plates 7020a and 7020b corresponding to cover plate 7020 of clamp 7000. are shown in FIG. 17 and are left off in FIG. 18. Clamp 8000 is shown mounted to a deck or slab surface 8001 in FIG. 21.

The principle described above by reference to FIGS. 14 and 15 is illustrated in FIG. 32, which shows a clamp 9700 made with two clamp halves 9000 and a bolt 9077. In the detail section two formation 9002 are shown and are "barreled" on surfaces 9762 rather than straight tapered.

As described above, clamps 7000 and 8000 have cover plates (7020 and 7018 in the case of clamp 7000 and 7020a and 7020b in the case of clamp 8000) that in use conceal fasteners by which these clamps are secured to surfaces or structures. A practical problem with such cover plates is that once secured in place, they can be difficult to remove if the need arises. If they fit closely in their recesses and if their external surfaces are truly (or nearly) flush with surrounding clamp surfaces, as is desirable for attractive appearance, there is nothing to grip to enable prising out of the plate if its removal is required.

There is now disclosed an improvement to clamps that addresses this problem. It is considered applicable not only to clamps of the types 7000 and 8000 described above, but generally to clamps for panels where a cover plate is provided to conceal fasteners, whether those fasteners hold the clamp together or hold it to a structure. For example, in the "A" publication of Australian patent application No. 2006251996 (which is incorporated herein in its entirety by reference) clamps are described with fastener-concealing cover plates—see for example the cover plate designated item 38 of the clamp designated item 30 in that publication. The improvement described below is applicable to clamps such as these also, and more generally to clamps for panels having fasteners that it is desirable to conceal behind one or more cover plates. More specifically, because this improvement is independent of the scheme by which the two clamp halves are secured to each other and a panel, it can be applied to clamps the same in general arrangement as clamps 7000 and 8000 but with the earlier locking schemes described by reference to FIGS. 7, 8, 9 and 10.

The general principle of the improvement will be described by reference to a clamp similar to clamp 8000. Referring to FIG. 18, showing clamp 8000, recesses 7933a and 7933b are provided to receive the cover plates 7020a and 7020b respectively so as to conceal heads of fasteners (not shown) that are installed through holes 7935a and 7935b. Lands 7937a and 7937b extend around openings 7935a and 7935b respectively. Cover plates 7020a and 7020b are placed in recesses 7933a and 7933b respectively and secured on lands 7937a and 7937b respectively using an adhesive such as for example a silicone-type adhesive. The completed appearance shown in FIG. 17 is thus obtained. The difficulty is to remove cover plates 7020a and 7020b when required.

FIG. 33 shows a clamp 8001 that is a modified version of clamp 8000 incorporating the improvement. FIG. 34 is a partial sectional view of clamp 8001, taken at station "122-122" in FIG. 33. Clamp 8001 has recesses 8003a and 8003b that, just as recesses 7933a and 7933b receive cover plates 7020a and 7020b, receive cover plates 8005a and 8005b. Using recess 8003b as an example that is representative also of recess 8003a, it has a first land 8007b that is similar to land 7937b except that it extends only partway around fastener opening 8009b within recess 8003b. A second land 8011b extends the rest of the way around opening 8009b and intersects land 8007b at a small angle. The intersection between lands 8007b and 8011b forms a slight ridge 8013b. Land 8007b is positioned and proportioned such that cover plate 8005b can be positioned on, and adhered to, land 8007b so that external surface 8013b of cover plate 8005b is flush with surrounding surfaces of clamp 8001 in the same way as cover plate 7020b is flush with surrounding surfaces of clamp 8000. To install cover plate 8005b, adhesive is placed on at least one of plate 8005b (specifically its inward facing surface) and land 8007b and plate 8005b is then placed in position in recess 7933b. Plate 8005b then adheres to land 8007b, but there is a wedge-shaped clearance 8015b between plate 8005b and second land 8011b within recess 8003b. If it is required to remove plate 8005b, plate 8005b can be pressed inward at such a location that the bond between plate 8005b and land 8007b is broken or at least plate 8005b and land 8007b can be pulled apart, and plate 8005b rotates on ridge 8013b, the clearance 8015b between plate 8005b and second land 8011b being reduced. The effect is that an edge 8023b of plate 8005b leaves recess 8003b far enough for plate 8005b to be easily gripped and removed from recess 8003b. FIG. 34 shows a force (represented by arrow 8017) applied to cover plate 8005b on an opposite side of ridge 8013b from land 8007b (that is, outside the periphery of the land 8007b) so as to rotate plate 8005b from its normal installed position (shown both in solid lines) to a position (shown in chain-dotted lines) from which it can be removed).

It will be appreciated that second land 8011b is strictly not necessary, and the function of first land 8007b could be served by several smaller lands in combination. (The term "land" normally refers to a surface, but the term is here intended also to include very small areas that act in effect as contact points.) What is essential to this improvement to clamps is that there be one or more such lands within a recess against which land or several lands in combination a cover plate abuts when in its installed position and to which the cover plate can be adhered to secure the cover plate within the recess, with those surfaces being so proportioned and so positioned within the recess that a first portion of the cover plate can be moved inward into the recess by application to the cover plate of a force directed outside the a periphery of the land or lands whereby a second portion of the cover plate emerges from the recess.

This improvement is considered an invention in its own right and, although described by reference to a clamp of the type shown as item 8000 (clamp 8001 simply being a clamp incorporating the improvement but otherwise identical to clamp 8000), could also be applied to a clamp such as clamp 7000 to make cover plates 7020 and also 7018 more easily removable. Similarly, the improvement could also be applied to other clamps in which cover plates are used to disguise parts such as fasteners, such as for example clamps otherwise similar to clamp 30 of the "A" publication of Australian patent application No. 2006251996.

Still other embodiments and variations, within the scope of the described invention, will in the light of the above description readily suggest themselves to persons skilled in the art.

The invention claimed is:

1. A clamp securable to a panel, the clamp comprising:
   a first clamping member that comprises a first clamping surface;
   a second clamping member that comprises a second clamping surface, wherein the second clamping surface faces the first clamping surface; and
   an elongate locating component whose length extends longitudinally in the clamp between the first and second clamping members; wherein:
   firstly the first clamping member comprises:
      a first formation that extends toward the second clamping member and circumferentially partway around a tapered portion of the elongate locating component, wherein a first free ended portion of the first formation lies laterally on an opposite side of the elongate locating component from the first clamping surface, and two first sidewalls formed on opposing sides of the first formation and facing the second clamping member;
   secondly the second clamping member comprises:
      a second formation that extends toward the first clamping member and circumferentially partway around the tapered portion of the elongate locating component, wherein a second free ended portion of the second formation lies laterally on an opposite side of the elongate locating component from the second clamping surface, and two second sidewalls formed on opposing sides of the second formation each second sidewall facing one of the first sidewalls comprised in the first clamping member;
   thirdly, the tapered portion of the elongate locating component contacts the first and second formations between the respective free ended portions thereof, and when advanced longitudinally moves the first and second free ended portions between:
      a first position, wherein the tapered portion is partially inserted between the free ended portions, such that first clearances exist between the first and second free ended portions and the second and first clamping members, respectively, and second clearances exist between mutually facing first and second sidewalls; and
      a second position, wherein further insertion of the tapered portion between the first and second free ended portions closes the second clearances while the first clearances remain unclosed; and
   fourthly, the first clamping member comprises a male guide formation and the second clamping member comprises a female recess, the male guide formation being located longitudinally at the first formation and being received within the female recess while the free ended portions of said first and second formations are between said first and second positions thereof, whereby contact between the male guide formation and the female recess limits relative movement of the first and second clamping members in a lateral direction approximately parallel to the first clamping surface.

2. The clamp according to claim 1 wherein the first and second free ended portions of the first and second formations are so positioned relative to the elongate locating component that during movement between their first and second positions the first and second free ended portions are laterally pushed apart partially normal and partially parallel to the first clamping surface and relative movement of the first and second free ended portions parallel to the first clamping surface is resisted by contact between the male guide formation and a surface within the female recess that is approximately normal to the first clamping surface.

3. A clamp for clamping panel-shaped members, comprising:
   a first clamping member that comprises a first clamping surface;
   a second clamping member that comprises a second clamping surface, wherein the second clamping surface faces the first clamping surface; and
   an elongate locating component whose length extends longitudinally in the clamp between the first and second clamping members; wherein:
   firstly the first clamping member comprises:
      a first formation that extends toward the second clamping member and circumferentially partway around a tapered portion of the elongate locating component, wherein a first free ended portion of the first formation lies laterally on an opposite side of the elongate locating component from the first clamping surface, and two first sidewalls formed on opposing sides of the first formation and facing the second clamping member;
   secondly the second clamping member comprises:
      a second formation that extends toward the first clamping member and circumferentially partway around the tapered portion of the elongate locating component, wherein a second free ended portion of the second formation lies laterally on an opposite side of the elongate locating component from the second clamping surface, and two second sidewalls formed on opposing sides of the second formation each second sidewall facing one of the first sidewalls comprised in the first clamping member; and
   thirdly, the tapered portion of the elongate locating component contacts the first and second formations between the respective free ended portions thereof, and when advanced longitudinally moves the first and second free ended portions between:
      a first position, wherein the tapered portion is partially inserted between the free ended portions, such that first clearances exist between the first and second free ended portions and the second and first clamping members, respectively, and second clearances exist between mutually facing first and second sidewalls; and a second position, wherein further insertion of the tapered portion between the first and second free ended portions closes the second clearances while the first clearances remain unclosed; and fourthly, the first clamping member comprises a laterally extending flange with a first opening adapted to receive therein a longitudinally extending first fastener for securing the flange to a first support surface; and the second clamping member comprises a longitudinally extending portion with a second opening adapted to receive therein a laterally extending second fastener for securing the longitudinally extending portion to a second support surface that is approximately perpendicular to the first support surface.

4. The clamp of claim 3 wherein the longitudinally extending portion has a face oriented to in use abut the second support surface.

5. The clamp of claim 4 wherein the first and second clamping surfaces are approximately co-planar with said face oriented to in use abut the second support surface.

6. The clamp of claim 3 wherein the first and second formations overlap with each other longitudinally.

7. The clamp of claim 3 wherein the clamp further comprises a nut held non-rotatingly captive between the first and second clamping members and with which a threaded section of the locating component is engaged, whereby the elongate locating component and the tapered portion thereof, when rotated, are movable longitudinally in the clamp.

8. The clamp of claim 3 wherein the first and second clamping members contact at least one of each other and the elongate locating component at a first location in the clamp that is remote longitudinally from the first and second clamping surfaces; and the first and second formations are located at a second location in the clamp that is less remote longitudinally from the first and second clamping surfaces than the said first location in the clamp.

9. The clamp of claim 3 wherein the longitudinally extending portion comprises a recess within which a head end of a second fastener extending through the second opening is receivable and further comprising a cover that is close-fittingly receivable in the recess whereby to conceal the head end.

10. The clamp of claim 9 wherein an outer face of the cover in use lies flush with an external surface of the longitudinally extending portion.

* * * * *